(12) United States Patent
Lu et al.

(10) Patent No.: US 8,195,989 B1
(45) Date of Patent: Jun. 5, 2012

(54) DETECTION OF ETHERNET LINK FAILURE

(75) Inventors: CunZhi Lu, Milipitas, CA (US);
Ramanarayanan Ramakrishnan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/860,431

(22) Filed: Aug. 20, 2010

(51) Int. Cl.
*G06F 11/00* (2006.01)

(52) U.S. Cl. ....... 714/56; 370/216; 370/229; 370/241.1; 370/242; 370/245; 370/384; 714/4.1; 714/43; 714/48; 714/51; 714/55

(58) Field of Classification Search ............... 370/216, 370/229, 241.1, 242, 245, 384; 714/4.1, 714/43, 48, 51, 55, 56

See application file for complete search history.

(56) References Cited

U.S. PATENT DOCUMENTS

| | | | |
|---|---|---|---|
| 6,424,629 B1* | 7/2002 | Rubino et al. ............. | 370/241.1 |
| 6,507,561 B1* | 1/2003 | Baniewicz et al. .......... | 370/216 |
| 6,512,740 B1* | 1/2003 | Baniewicz et al. .......... | 370/216 |
| 6,700,873 B1* | 3/2004 | Sugaya et al. ............. | 370/241.1 |
| 6,756,898 B2* | 6/2004 | Ikematsu .................. | 340/531 |
| 6,771,599 B1* | 8/2004 | Aoyama et al. ............ | 370/230 |
| 7,212,492 B1* | 5/2007 | Au et al. ................. | 370/229 |
| 7,558,274 B1* | 7/2009 | Kinsky et al. ............. | 370/395.54 |
| 7,693,078 B2* | 4/2010 | Gonda .................... | 370/241.1 |
| 7,839,795 B2* | 11/2010 | Felkar et al. ............. | 370/245 |
| 7,983,183 B2* | 7/2011 | Ostrup et al. ............. | 370/252 |
| 8,014,297 B2* | 9/2011 | Yoshida et al. ............ | 370/241.1 |
| 8,018,857 B2* | 9/2011 | Gonda .................... | 370/241.1 |
| 2002/0196784 A1* | 12/2002 | Masuda ................... | 370/355 |
| 2003/0058106 A1* | 3/2003 | Ikematsu ................. | 340/568.1 |
| 2004/0081090 A1* | 4/2004 | Hara et al. ............... | 370/229 |
| 2004/0170128 A1* | 9/2004 | Takamichi ................ | 370/245 |
| 2004/0179521 A1* | 9/2004 | Kim et al. ................ | 370/384 |
| 2005/0108401 A1* | 5/2005 | Gonda .................... | 709/227 |
| 2005/0249124 A1* | 11/2005 | Elie-Dit-Cosaque et al. | 370/242 |
| 2006/0143548 A1* | 6/2006 | DelRegno et al. .......... | 714/48 |
| 2006/0182036 A1* | 8/2006 | Sasagawa et al. .......... | 370/242 |
| 2006/0203716 A1* | 9/2006 | Gilligan ................. | 370/216 |
| 2007/0097857 A1* | 5/2007 | Zhai ..................... | 370/218 |
| 2008/0031146 A1* | 2/2008 | Kwak et al. .............. | 370/250 |
| 2009/0003192 A1* | 1/2009 | Martinotti et al. ........ | 370/216 |
| 2009/0141640 A1* | 6/2009 | Polland et al. ........... | 370/242 |
| 2009/0147672 A1* | 6/2009 | Chun et al. .............. | 370/225 |
| 2009/0175166 A1* | 7/2009 | Long et al. .............. | 370/225 |
| 2010/0014435 A1* | 1/2010 | Bugenhagen .............. | 370/245 |
| 2010/0091792 A1* | 4/2010 | Sasaki et al. ............ | 370/466 |
| 2010/0128610 A1* | 5/2010 | Gonda .................... | 370/241.1 |
| 2010/0135162 A1* | 6/2010 | Takase et al. ............ | 370/242 |
| 2010/0208595 A1* | 8/2010 | Zhao et al. .............. | 370/242 |
| 2010/0246406 A1* | 9/2010 | Hill et al. .............. | 370/241.1 |
| 2010/0260053 A1* | 10/2010 | Mack-Crane ............. | 370/241.1 |
| 2010/0315960 A1* | 12/2010 | Li ....................... | 370/252 |
| 2011/0116363 A1* | 5/2011 | Elie-Dit-Cosaque et al. | 370/216 |
| 2011/0191637 A1* | 8/2011 | Wight et al. ............. | 714/43 |

* cited by examiner

*Primary Examiner* — Robert Beausoliel, Jr.
*Assistant Examiner* — Joshua P Lottich
(74) *Attorney, Agent, or Firm* — Harrity & Harrity, LLP

(57) ABSTRACT

A device may detect and report failure in point-to-point Ethernet links. In one implementation, the device may determine, based on a periodic timing signal, whether at least one packet was received on an incoming Ethernet link during a previous period of the periodic timing signal. The device may update an entry in a circular buffer to indicate whether the at least one packet was received during the previous period of the periodic timing signal and analyze the circular buffer to determine whether there is a signal failure on the incoming Ethernet link.

30 Claims, 18 Drawing Sheets

DETECTION OF ETHERNET LINK FAILURE

BACKGROUND

Ethernet is a widely used networking standard that operates in the OSI (Open Systems Interconnection) reference model in the data link layer. In full-duplex (point-to-point) mode over an Ethernet connection, a pair of devices communicate over the physical media (a dedicated channel). A central bridge (also known as a switch or hub) may include multiple ports and may be used to connect multiple devices in a network.

Communication failures may occasionally occur between devices communicating over a point-to-point link. For example, the physical media, such as a twisted-pair cable, may become physically disconnected. The Ethernet standard may use an auto negotiation mechanism to monitor the connection between two devices. A connection failure, when detected, may be reported to a higher layer in the OSI reference model. With Ethernet auto negotiation, however, detection of a failure over a point-to-point connection may take over one-hundred and fifty (150) milliseconds (ms).

For high bandwidth, low latency applications, a 150 ms delay to detect failure between two point-to-point connections may not be fast enough. When Ethernet is deployed in carrier networks, for example, it may be desirable to more quickly detect and report failures.

SUMMARY

One implementation is directed to a device that may include a timer to generate a periodic signal and a register to indicate whether a packet has been received over an incoming Ethernet link to the device for each of a number of periods of the periodic signal. The device may further include a buffer that includes a number of storage locations, each of the storage locations corresponding to one of the periods of the periodic signal; and control logic. The control logic may, for each of the periods: set a value, corresponding to one of the storage locations, in the buffer when the register indicates that a packet has been received over the incoming Ethernet link; clear the value in the buffer when the register indicates that no packets have been received over the incoming Ethernet link; and reset the register to indicate that no packets have been received.

Another implementation is directed to a method that determines, based on a first periodic timing signal, whether a packet was transmitted on an outgoing Ethernet link from a device during a previous period of the first periodic timing signal. The method may transmit a null packet on the outgoing Ethernet link when a packet was not transmitted on the outgoing Ethernet link during the previous period of the first periodic timing signal. The method may determine, based on a second periodic timing signal, whether at least one packet was received on an incoming Ethernet link during a previous period of the second periodic timing signal. The method may update an entry in a circular buffer to indicate whether the at least one packet was received during the previous period of the second periodic timing signal; analyze the circular buffer to determine whether there is a signal failure on the incoming Ethernet link; and generate an indication of whether there is a signal failure on the incoming Ethernet link.

Another implementation is directed to a method that may include receiving, by a node in a number of nodes that implement an Ethernet circuit, an indication of a failure of an incoming Ethernet link at a port of the node; transmitting a first failure notification data unit in response to the received indication of failure, the failure notification data unit being transmitted at a second port of the node and in a downstream direction within the Ethernet circuit relative to the failed incoming Ethernet link; determining, in response to reception of a second failure notification data unit, whether a destination address of the second failure notification data unit matches an address of the node; and outputting an indication of failure of the Ethernet circuit when the destination address of the second failure notification data unit matches the address of the node.

In another implementation, a device may include a number of ports and logic to detect a signal failure of an incoming Ethernet link, which is part of an Ethernet circuit, at a first one of the ports and to output a corresponding signal failure signal. The device may further include logic to transmit a first failure notification data unit in response to the signal failure signal, the first failure notification data unit being transmitted at a second one of the plurality of ports and in a downstream direction within the Ethernet circuit relative to the failed incoming Ethernet link. The device may further include logic to receive an indication of cessation of a failure of the incoming Ethernet link at the first one of the plurality of ports; and logic to transmit a failure cleared notification data unit in response to the received indication of cessation of the failure, the failure cleared notification data unit being transmitted at the second port of the node and in the downstream direction within the Ethernet circuit relative to the incoming Ethernet link.

In another possible implementation, a method may include determining, by a node in a number of nodes that implement an Ethernet circuit, and based on a first periodic timing signal, whether at least one packet was received on an incoming Ethernet link, at a first port of the node, during a previous period of the first periodic timing signal; updating, by the node, an entry in a circular buffer to indicate whether the at least one packet was received during the previous period of the first periodic timing signal; analyzing, by the node, the circular buffer to determine whether there is a signal failure on the incoming Ethernet link; and generating, by the node and based on the analysis, an indication of whether there is a signal failure on the incoming Ethernet link. The method may further include transmitting a first failure notification data unit in response to the generated indication of failure, the failure notification data unit being transmitted at a second port of the node and in a downstream direction within the Ethernet circuit relative to the failed incoming Ethernet link; and transmitting, by the node, a failure cleared notification data unit in response to cessation of the indication that there is a signal failure on the incoming Ethernet link, the failure cleared notification data unit being transmitted at a second port of the node and in the downstream direction within the Ethernet circuit relative to the incoming Ethernet link.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

Techniques for detecting and reporting failure in point-to-point Ethernet links are described herein. The techniques may quickly detect link failure. In one implementation, link failure may be detected in approximately five (5) ms. In some implementations, link failure may be further quantified as a signal failure (i.e., a complete failure) or as signal degradation (partial signal failure). In additional implementations, in response to a link failure, a failure notification may be transmitted to other network devices, using failure notification codes, in a way that informs management software of the failure.

In the description that follows, networked devices will be described as communicating packets of data. Other fixed length or variable length units of data could alternatively be used.

SYSTEM OVERVIEW

Figure 1:
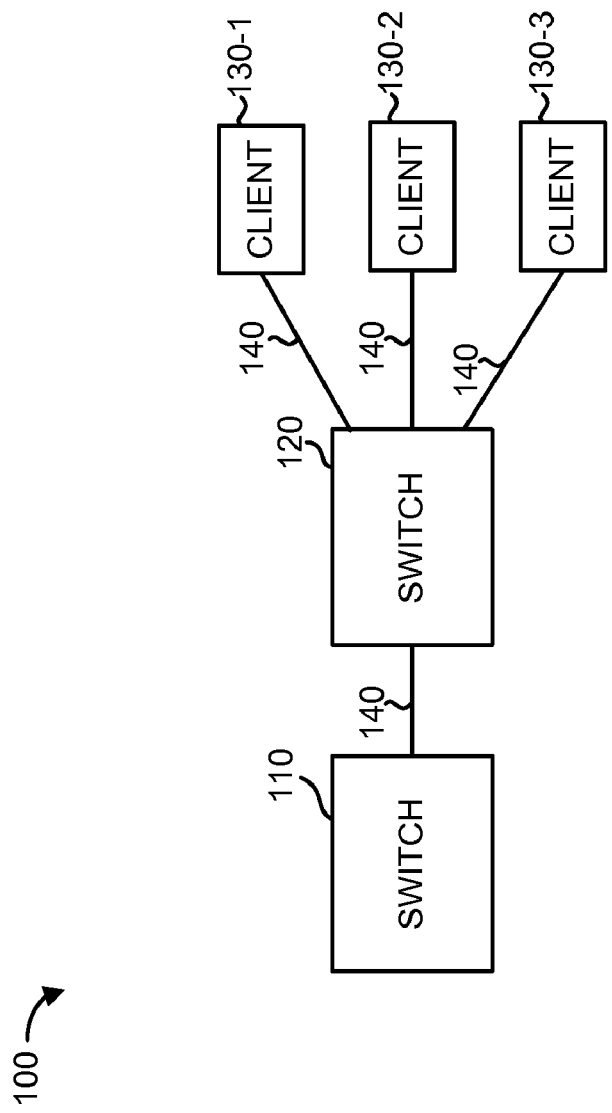
FIG. 1 is a diagram of an example of an environment in which concepts described herein may be implemented.

FIG. 1 is a diagram of an example of an environment 100 in which concepts described herein may be implemented. Environment 100 may implement an Ethernet network, such as an Ethernet-based local area network (LAN). As particularly shown, environment 100 may include a first switch 110, a second switch 120, and clients 130-1 through 130-3 (collectively "clients 130"). Each of switch 110, switch 120, and clients 130 may implement an endpoint in an Ethernet point-to-point link. Physical media 140 between endpoints may include, for example, optical fiber or copper cabling.

Switches 110 and 120 may each be network devices designed to connect network segments. Each of switches 110 and 120 may include a number of ports, where a port may include a physical connector to connect to physical media 140. Packets received at one port may be processed and output by switches 110 and 120 at another port. In this manner, clients 130 may communicate with one another through switches 110/120.

Switches 110 and 120, as used herein, may include network bridges that process data at the data link layer of the OSI model, Layer 3 switches that additionally process data at the network layer of the OSI model, or passive devices such as a hub or repeater.

Clients 130 may generally include any network device or computing device that communicates with other devices in a network. Clients 130 may particularly include, for example, general-purpose computing devices such as personal computers, laptops (or other portable computing devices), servers, or smartphones. Clients 130 may generally be used by end-users or may be used to provide services to other computing devices in environment 100. Clients 130 may also include network devices, such as gateways, firewalls, or other devices used to implement a network such as a LAN.

Clients 130 may include network interface cards (NICs) that implement an interface for the physical and data link layer. Through a NIC, a client 130 may send and receive data units, such as packets. In some implementations, a NIC may be implemented as a separate card that can be inserted and removed from a client 130. In other implementations, a NIC may be implemented in circuitry that is integrated within or on the same printed circuit board as other elements of a client 130.

FIG. 1 shows an example of components that may be included in environment 100. In other implementations, environment 100 may include fewer, different, differently arranged, or additional components than depicted in FIG. 1. Alternatively, or additionally, one or more components of environment 100 may perform one or more tasks described as being performed by one or more other components of environment 100.

Figure 2:
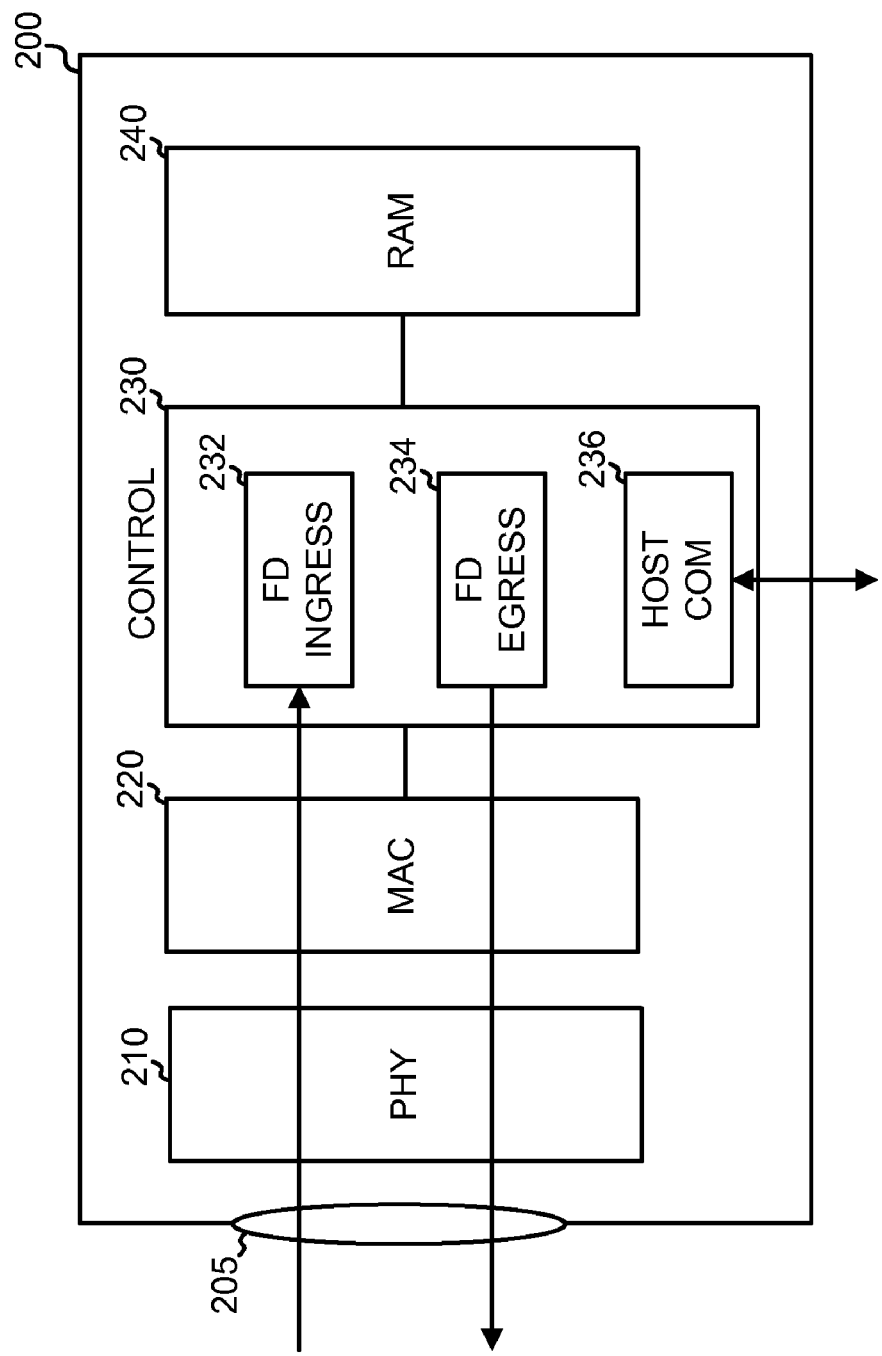
FIG. 2 is a diagram illustrating an example of an implementation of a networking component.

FIG. 2 is a diagram illustrating an example of an implementation of a networking component 200 of switch 110/120 or client 130. Networking component 200 may, for example, be implemented for each port of switch 110/120. For clients 130, networking component 20 may be implemented as part of the NIC used by clients 130. In general, networking component 200 may operate at the physical and/or data link layers for the Ethernet point-to-point links of environment 100.

Networking component 200 may include a port 205 that is designed to connect to a physical transport medium for the network. Port 205 may also be associated with physical-layer transceiver (PHY) logic 210 and media access controller (MAC) logic 220. Networking component 200 may additionally include control logic 230 and memory (e.g., random access memory (RAM)) 240.

Port 205 may include a mechanical slot designed to receive a network cable, such as standard category 5, 5e, or 6 twisted-pair cables. PHY logic 210 may generally operate to encode and decode data that is transmitted and received over port 205. MAC logic 220 may act as an interface between the physical layer, as output from PHY logic 210, and control logic 230. MAC logic 220 may provide addressing and channel access control mechanisms that make it possible for devices to communicate.

Control logic 230 may include logic that controls the incoming and outgoing flow of packets from networking component 200. Control logic 230 may control the writing/reading of packets to RAM 240 for temporary storage. Control logic 230 may particularly include failure detection (FD) ingress logic 232, FD egress logic 234, and host communication (COM) logic 236. Control logic 330 may be implemented using, for example, a general-purpose microprocessor or based on other types of control logic, such as an application specific integrated circuit (ASIC) or a field programmable gate array (FPGA).

FD ingress logic 232 may operate to detect link failures relating to the link formed between networking component 200 and the networking component connected to the other end of the point-to-point link. In one implementation, FD ingress logic 232 may detect, in addition to complete link failures, degradation in the signal quality on a link. FD ingress logic 232 may output an indication of the status of the link (e.g., failed, degraded, or working) to switch 110/120 or client 130. The link status information may be used to, for example, control a topology of the network. In environment 100, for example, switches 110 and 120 may, in response to detection of a link failure, re-route traffic from the failed link to an alternate link. FD ingress logic 232 will be described in more detail below with reference to FIGS. 7-10.

FD egress logic 234 may operate in conjunction with FD ingress logic 232, implemented at a switch or client at the other end of the point-to-point link, to detect link failures. FD egress logic 234 will be described in more detail below with reference to FIGS. 4-6.

Host communication logic 236 may include an interface through which networking components 200 communicate with a switch 110/120 or client 130 that includes host communication logic. For example, host communication logic 236 may implement a peripheral component interconnect (PCI) bus, PCI express (PCI-E), or other bus architecture.

In FIG. 2, FD ingress logic 232 and FD egress logic 234 are illustrated as part of control logic 230. In an alternative implementation, FD ingress logic 232 and FD egress logic 234 may be included as part of MAC logic 220.

RAM 240 may include memory, such as high speed random access memory, that may be used to buffer incoming and/or outgoing packets. In one implementation, incoming packets may be stored in RAM 240 and a host (i.e., other logic in switch 110/120 or one of clients 130) may read the packets from RAM 240 using a direct memory access (DMA) technique in which the host directly reads the packets from RAM 240.

FIG. 2 shows examples of components that may be included in networking component 200. In other implementations, networking component 200 may include fewer, different, differently arranged, or additional components than depicted in FIG. 1. Alternatively, or additionally, one or more components of networking component 200 may perform one or more tasks described as being performed by one or more other components of networking component 200.

Figure 3:
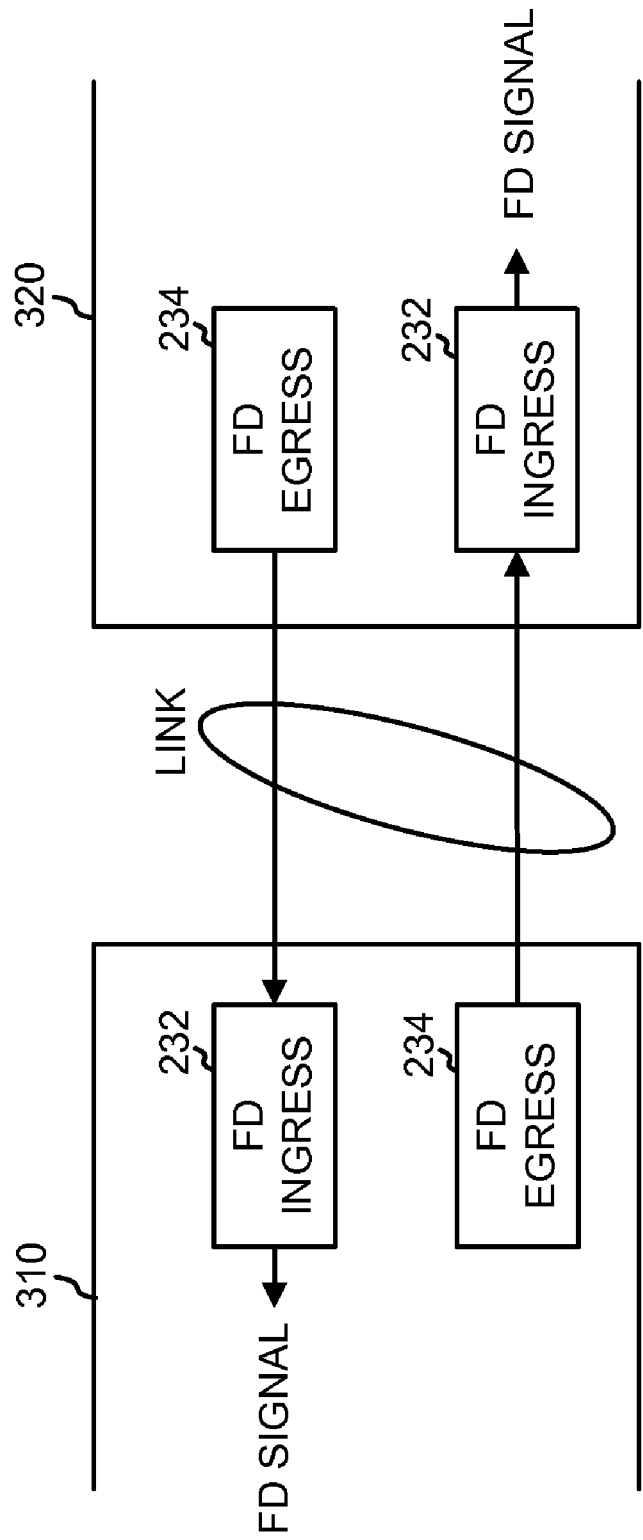
FIG. 3 is a simplified diagram of an example of corresponding pairs of failure detection ingress logic and failure detection egress logic.

FIG. 3 is a simplified diagram of an example of corresponding pairs of FD ingress logic 232 and FD egress logic 234, implemented at corresponding pairs of devices, such as switches 110 or 120, or clients 130 (labeled as devices 310 and 320). FD ingress logic 232 in device 310 may be operatively coupled to FD egress logic 234 in device 320. Similarly, FD ingress logic 232 in device 320 may be operatively coupled to FD egress logic 234 in device 310. FD ingress logic 232 in both devices 310 and 320 may output a signal (FD SIGNAL) indicating the state of the link between devices 310 and 320.

Although both devices 310 and 320 are illustrated in FIG. 3 as including both FD ingress logic 232 and FD egress logic 234, in some implementations, a device may not necessarily include both the ingress and egress failure detection logic. A client 130, for instance, may be implemented to include only FD egress logic 234, while switches 110/120 may include both FD ingress logic 232 and FD egress logic 234.

EGRESS FAILURE DETECTION LOGIC

Figure 4:
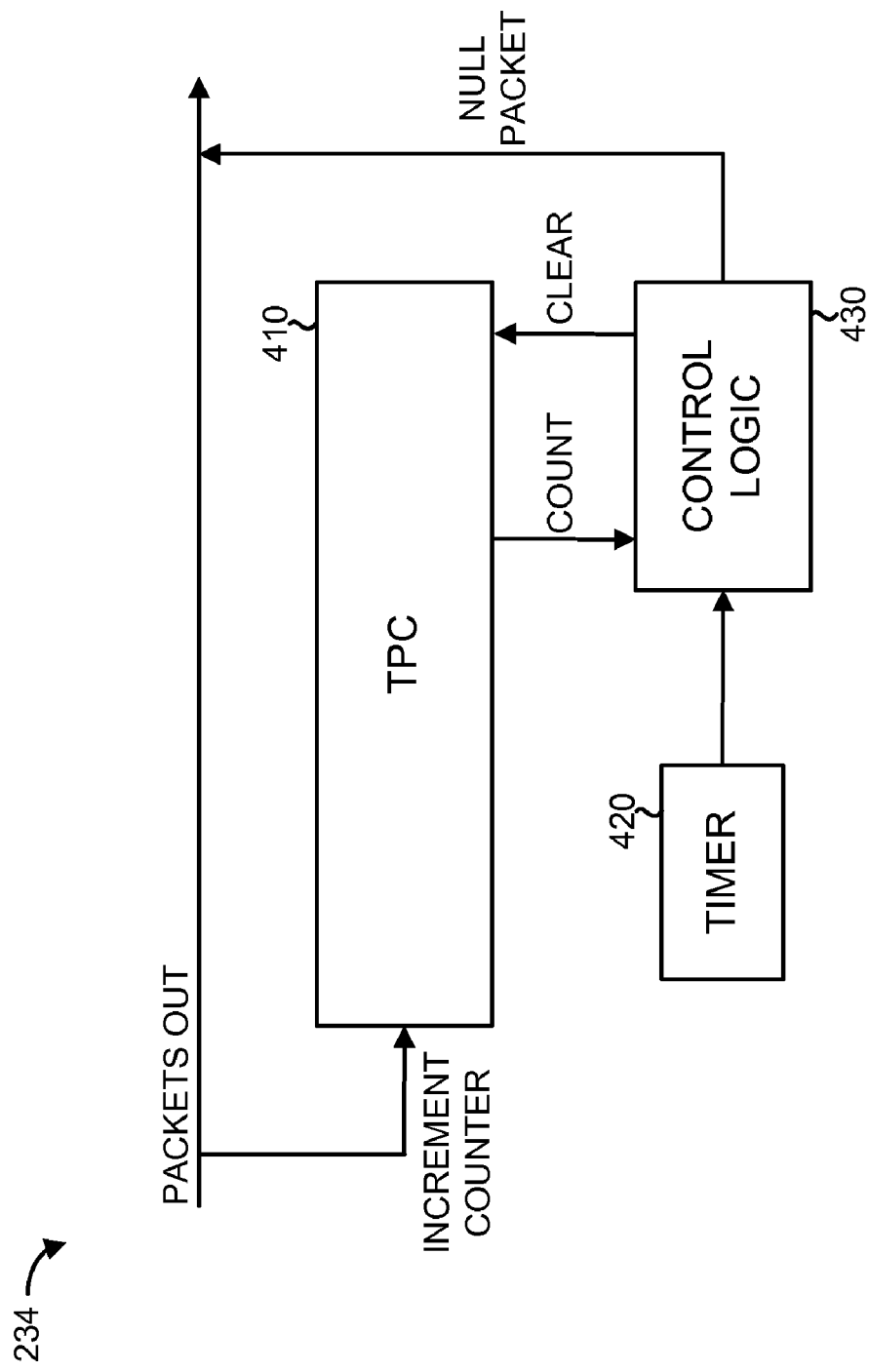
FIG. 4 is a block diagram illustrating an example of an implementation of failure detection egress logic.

FIG. 4 is a block diagram illustrating an example of an implementation of FD egress logic 234. As shown, FD egress logic 234 may include a transmission packet counter (TPC) 410, a timer 420, and control logic 430.

TPC 410 may count a number of packets sent from networking component 200. Each output packet may cause TPC 410 to increment. In alternative possible implementation, instead of implementing TPC 410 as a full counter, TPC 410 may be implemented as a register that is set when a packet is sent. In this case, additional packets received after the first packet, which transitions the register from "unset" to "set" may not affect the state of the register.

Timer 420 may output a periodic signal to control logic 430. The period of the signal may be preset in timer 420 or may be programmable. In one implementation, timer 420 may be set to 0.5 ms (that is, every half millisecond, timer 420 may output a timing signal). The signal output from timer 420 may be input to control logic 430.

Control logic 430 may, based on the signal received from timer 420, read the count value from TPC 410 and reset the count value to zero (clear TPC 410 when TPC 410 is a single bit register). Control logic 430 may also output a null packet. The null packet may include a dummy packet that is to be sent from networking component 200. More particularly, at every signal received from timer 420, such as a signal received every half millisecond, control logic 420 may read and clear TPC 410. When the value read from TPC 410 is equal to zero, indicating no packets were received in the time period since the last signal from timer 420, control logic 430 may send the null packet. In this manner, the link should not be inactive for more than the time period of timer 420.

Figure 5:
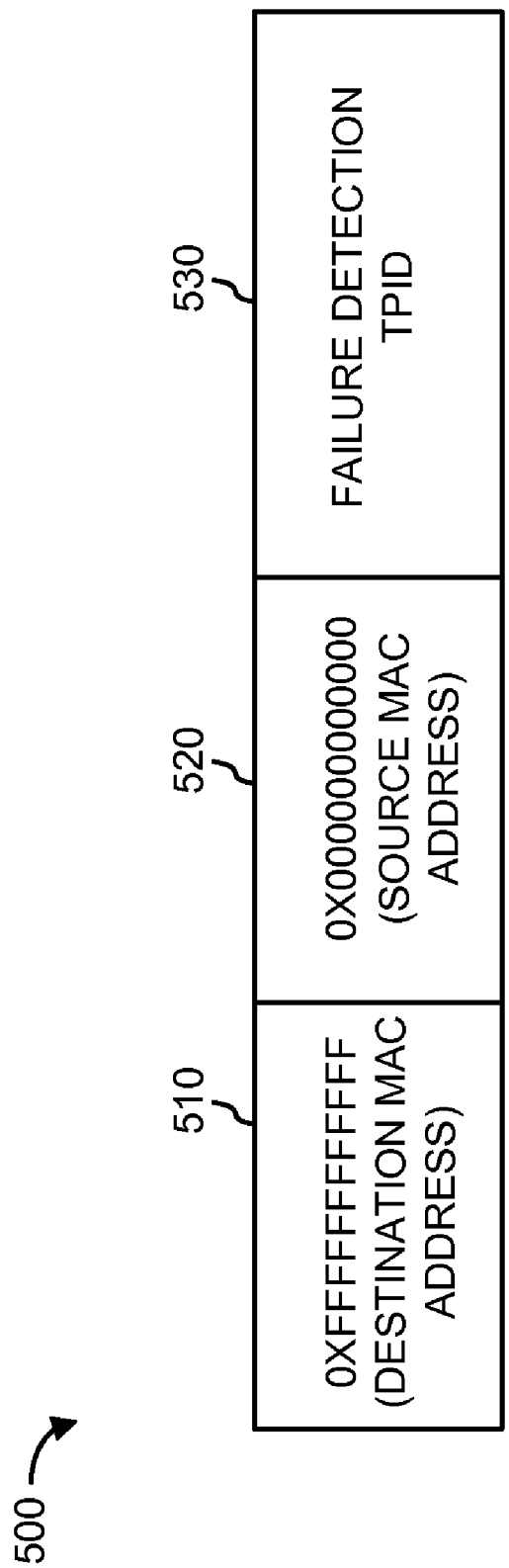
FIG. 5 is a diagram illustrating an example of a format for a null packet.

FIG. 5 is a diagram illustrating an example of a format for a null packet 500 that may be sent by control logic 430. Packet 500 may include a destination media access control (MAC) address section 510, a source MAC address section 520, and a failure detection tag protocol identifier (TPID) section 530. Destination MAC address section 510 may be a six octet field that is set to all "one" bit values (i.e., hex value 0xFFFFFFFFFFFF) and source MAC address section 520 may be a six octet field that is set to all "zero" bit values (i.e., hex value 0x000000000000). failure detection TPID section 530 may be set to a value that indicates a null packet. For example, failure detection TPID field 530 may be set to a predetermined value that networking component 200 in environment 100 recognizes as corresponding to a null packet.

The section values shown for null packet 500 illustrate an example of possible values. Other values could be used to indicate to a receiving device that the packet is intended to be a null packet.

Figure 6:
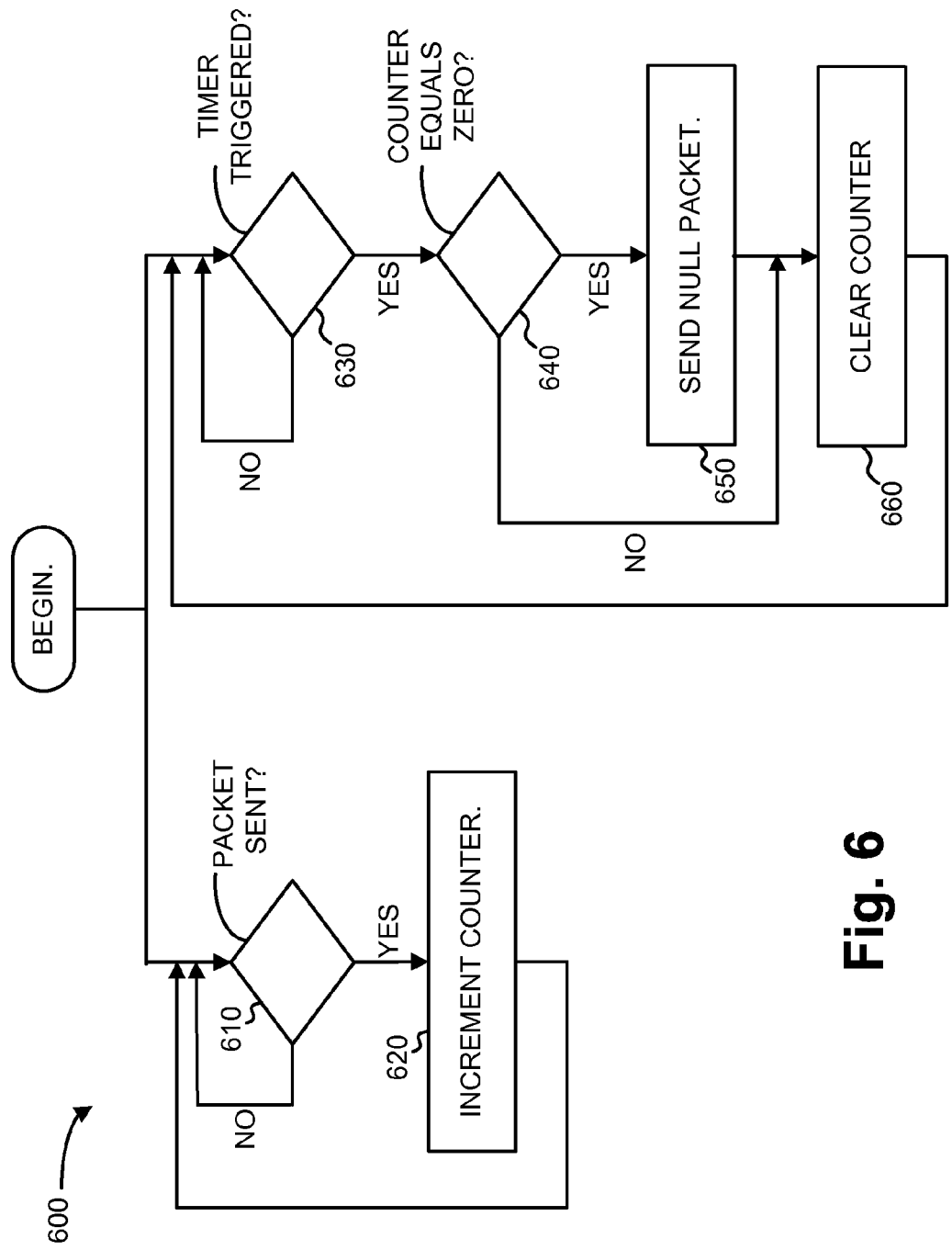
FIG. 6 is a flow chart illustrating an example of a process for the operation of the failure detection egress logic of FIG. 4.

FIG. 6 is a flow chart illustrating an example of a process 600 for the operation of FD egress logic 234. As shown in FIG. 6, process 600 may include two sub-processes that may be executed in parallel by FD egress logic 234. The first sub-process is shown in FIG. 6 as blocks 610 and 620, and the second sub-process is illustrated in blocks 630, 640, 650, and 660.

Process 600 may include determining when a packet is sent or is about to be sent (block 610). When a packet is sent (block 610—YES), a counter, such as TPC 410 may be incremented (block 620). In this way, TPC 410 may keep track of the number of packets sent since TPC 410 was last cleared. In some implementations, it may not be necessary to know the number of packets transmitted, but only whether one or more packets have been transmitted since the last time the counter was cleared. In this situation, TPC 410, instead of being implemented as a counter, may be implemented as a register or other flag that can toggle between a "set" (e.g., a packet was sent) and "unset" (e.g., a packet has not yet been set) state.

Process 600 may further include determining whether a timer, such as timer 420, has triggered (block 630). As mentioned above, timer 420 may be set to trigger based a periodic time period, such as 0.5 ms. Other time periods could alternatively be used. Different time periods may affect the sensitivity of the determination by FD ingress logic of whether a link failure occurs.

Process 600 may further include, when the timer expires (block 630—YES), determining whether a counter, such as TPC 410, is set to zero (block 640). If so, this may indicate that no packets were sent over the link in the previous period of timer 420. A null packet may thus be sent (block 640—YES; and block 650). In response to the determination that the counter value is not zero (block 640—NO) or to the null packet being sent (block 650), the counter may be cleared (block 660).

Blocks 630, 640, 650, and 660 may be repeated based on each triggering of timer 420. In this manner, a minimum of one null packet may be sent over the link during each time period of timer 420.

INGRESS FAILURE DETECTION LOGIC

Figure 7:
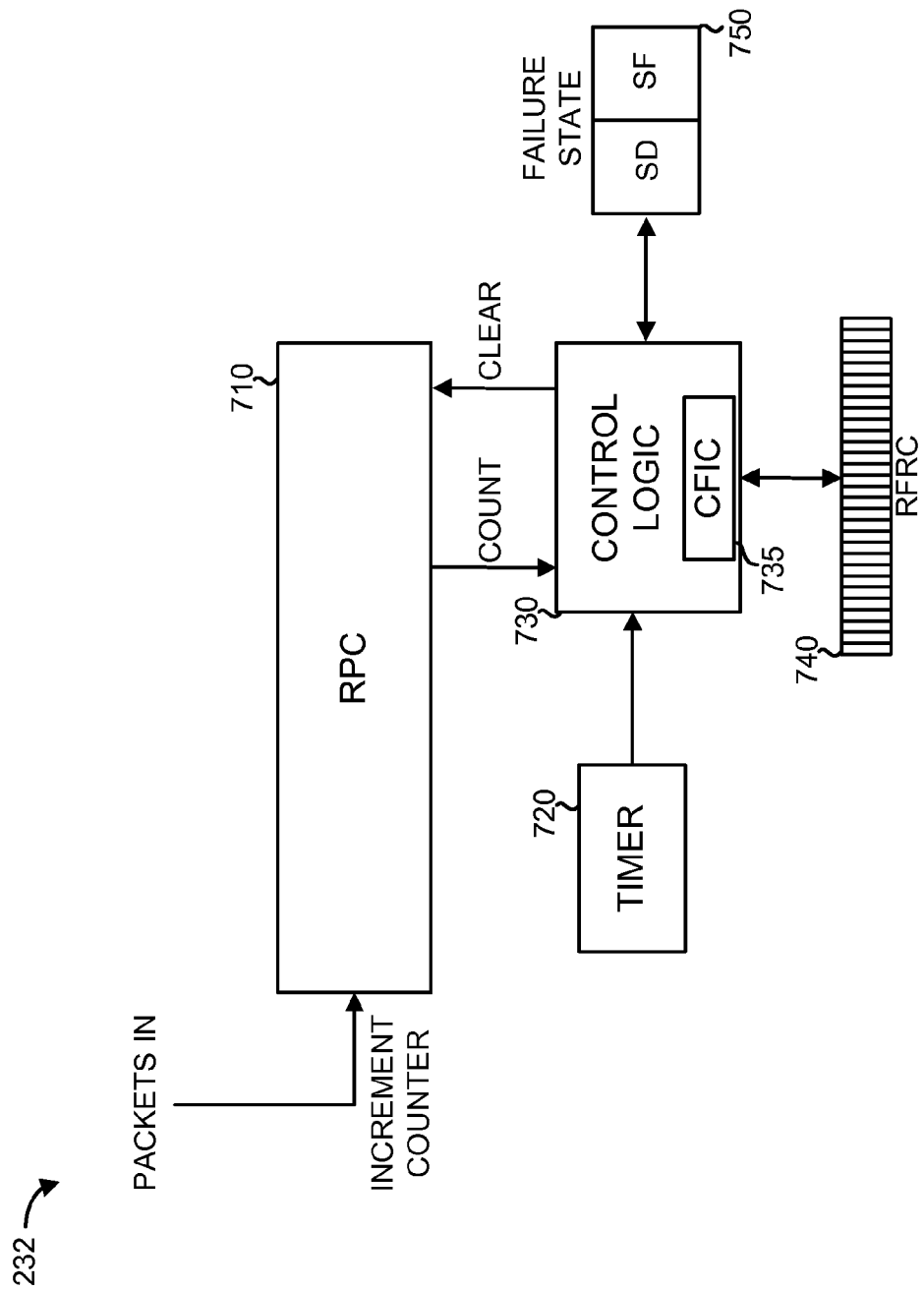
FIG. 7 is a block diagram illustrating an example of an implementation of failure detection ingress logic.

FIG. 7 is a block diagram illustrating an example of an implementation of FD ingress logic 232. FD ingress logic 232 may operate as a compliment to FD egress logic 234.

FD ingress logic 232 may include a receiving packet counter (RPC) 710, a timer 720, control logic 730, a rotate frame record register (RFRC) 740, and a failure state register (FAILURE STATE) 750. Control logic 730 may particularly include a current frame index count (CFIC) register 735 that may be used to keep track of a current position in RFRC 740.

RPC 710 may include a counter or register to count or store the number of packets received over the link. Each input packet may cause RPC 710 to increment. In an alternative possible implementation, instead of implementing RPC 710 as a full counter, RPC 710 may be implemented as a single-bit register that is set when a packet is received. In this case, additional packets received after the first packet, which transitions the register from "unset" to "set," may not affect the state of the register.

Timer 720 may output a periodic signal to control logic 730. The period of the signal may be preset in timer 720 or may be programmable. In one implementation, timer 720 may be set to 1.0 ms (that is, every millisecond, timer 720 may output a timing signal). The signal output from timer 720 may be input to control logic 730.

Control logic 730 may, based on the signal received from timer 720, read the count value from RPC 710 and clear (or unset) RPC 710. Control logic 730 may also update values in RFRC 740. At certain times, control logic 730 may analyze the current state of RFRC 740 to determine the current failure state of the link. The current failure state of the link may be stored in failure state register 750. Control logic 730 may also update CFIC 735, which may include a register that stores the current position within RFRC 740.

RFRC 740 may include a multi-bit register that implements a circular buffer. In one implementation, RFRC 740 may include a 32-bit register. Each bit in the register may record whether at least one packet was received in the previous period, as signaled by timer 720. CFIC 735 may store the current position (i.e., the current active bit) in RFRC 740. If the current position stored by CDIC 735 is the last position in RFRC 740 (e.g., bit 31 when RFRC 740 is a 32 bit register that includes bits zero through 31), control logic 730 may control CFIC 735 so that the next active bit is the first position in RFRC 740 (e.g., bit zero).

Failure state register 750 may store a current failure state of the link. In the implementation illustrated in FIG. 7, failure state register 750 may be a two-bit register that includes bits labeled as signal degraded (SD) and signal failed (SF). When the SD bit is set and the SF bit unset, a signal degradation state may be occurring; when the SD bit is unset and the SF bit is set, a signal failed state may be occurring; and when both the SD and SF bits are unset, a normal "working" state may be occurring. Having both the SD and SF bits set may be an invalid value.

In some implementations, instead of generating a working, signal degraded, and signal failed state, FD egress logic 232 may output additional or fewer state values to quantify the current state of the link. For example, FD egress logic 232 may output only a working or signal failed state.

FIG. 7 shows an example of components that may be included in FD ingress logic 232. In other implementations, FD ingress logic 232 may include fewer, different, differently arranged, or additional components than depicted in FIG. 7. Alternatively or additionally, one or more components of FD ingress logic 232 may perform one or more tasks described as being performed by one or more other components of FD egress logic 232.

Figure 8:
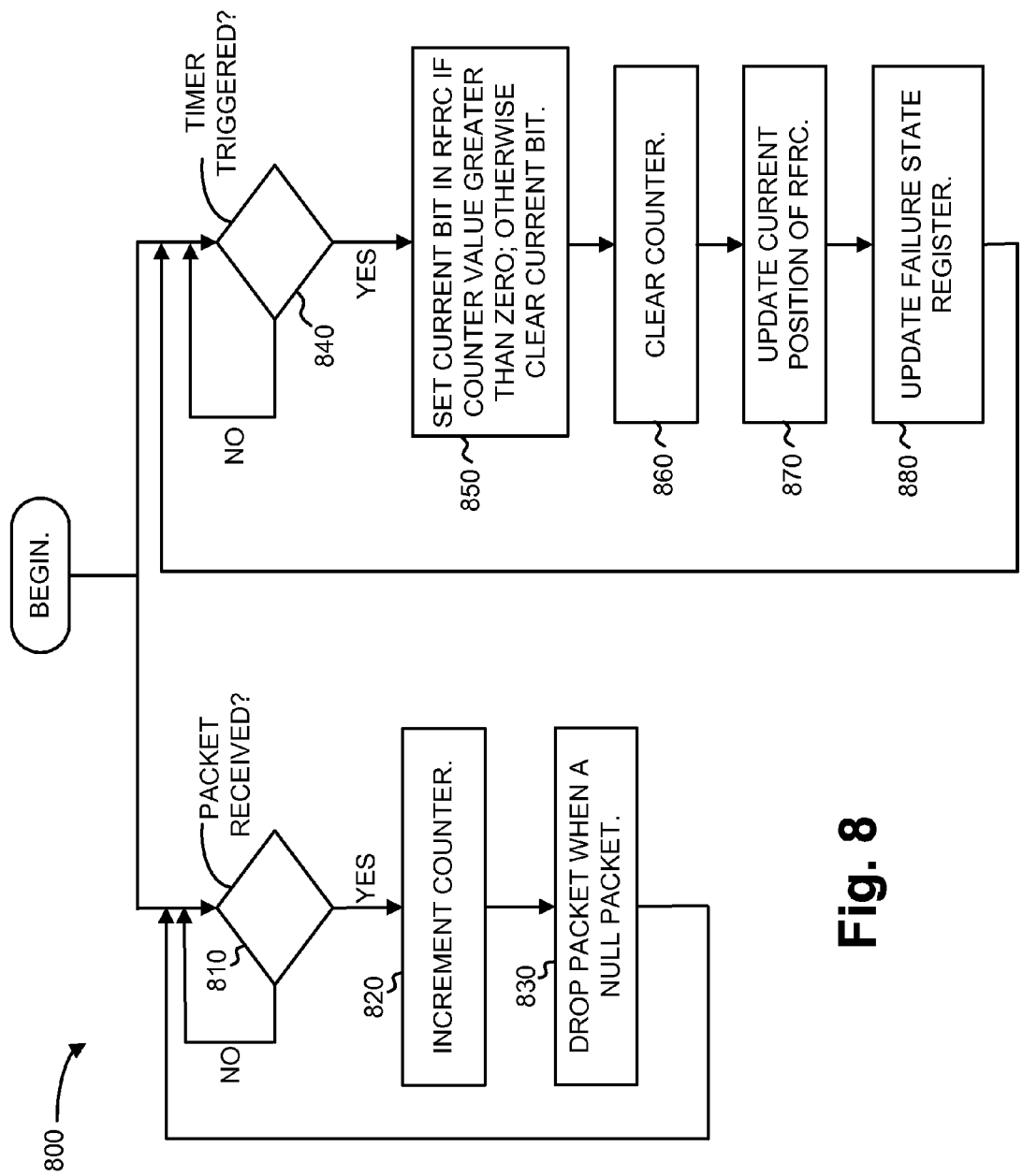
FIG. 8 is a flow chart illustrating an example of a process for the operation of the failure detection ingress logic of FIG. 7.

FIG. 8 is a flow chart illustrating an example of a process 800 for the operation of FD ingress logic 234. As shown in FIG. 8, process 800 may include two sub-processes that may be executed in parallel by FD ingress logic 234. The first sub-process is shown in FIG. 8 as blocks 810, 820, and 830, and the second sub-process is illustrated in blocks 840, 850, 860, 870, and 880.

Process 800 may include determining when a packet is received over the link being monitored (block 810). When a packet is received (block 820—YES), a counter, such as RPC 710 may be incremented (block 820). In this way, RPC 710 may keep track of the number of packets received since RPC 710 was last cleared. In some implementations, it may not be necessary to know the number of packets received, but only whether one or more packets have been received since the last time the counter was cleared. In this situation, RPC 710, instead of being implemented as a counter, may be implemented as a register or other flag that can be toggled between a "set" (e.g., a packet was received) and "unset" (e.g., a packet has not yet been received) state.

Process 800 may further include dropping any null packets that are received (block 830). Because the null packets are sent to ensure that the link is active even when there are no normal packets to send, the null packets are not otherwise needed and may be dropped.

Process 800 may further include determining whether a timer, such as timer 720, has triggered (block 840). As mentioned above, timer 720 may be set to trigger based on a periodic time period, such as 1.0 ms. Other time periods could alternatively be used. Different time periods may affect the sensitivity of the determination by FD ingress logic 234 of whether a link failure occurs.

Process 800 may further include, when the timer triggers (block 840—YES), setting or unsetting the current bit in RFRC 740 (block 850). As previously mentioned, the current position in RFRC 740 may be stored in CFIC 735. In one implementation, the current bit in RFRC 740 may be set when the value in RPC 710 is greater than or equal to one (i.e., at least one packet was received in the last period of timer 720) (block 850). The current bit in RFRC 740 may be unset (cleared) when the value in RPC 710 is equal to zero (block 850).

Process 800 may further include clearing (resetting) RPC 710 (block 860). Setting RPC 710 to zero may effectively reinitialize RPC 710 for the next period of timer 710. The current position in RFRC 740 may be updated (block 870). Updating the current position of RFRC 740 may include incrementing the value stored in CFIC 735. When the value of CFIC 735 refers to the last position in RFRC 740, the value may be set to correspond to the first position in RFRC 740.

Process 800 may further include updating failure state register 750 (block 880). Updating failure state register 750 may include analyzing RFRC 740 to determine the failure state of the link. The updated value of failure state register 750 may be read by and acted upon by other processes or other logic in the device that includes networking component 200. Examples of processes that may be used to update failure state register 750 will be discussed with reference to the flow charts of FIGS. 9 and 10. In some implementations, after updating failure state register 750 to include a new failure state, an interrupt or other signal may be output to apprise other components of the change in the link state.

Figure 9:
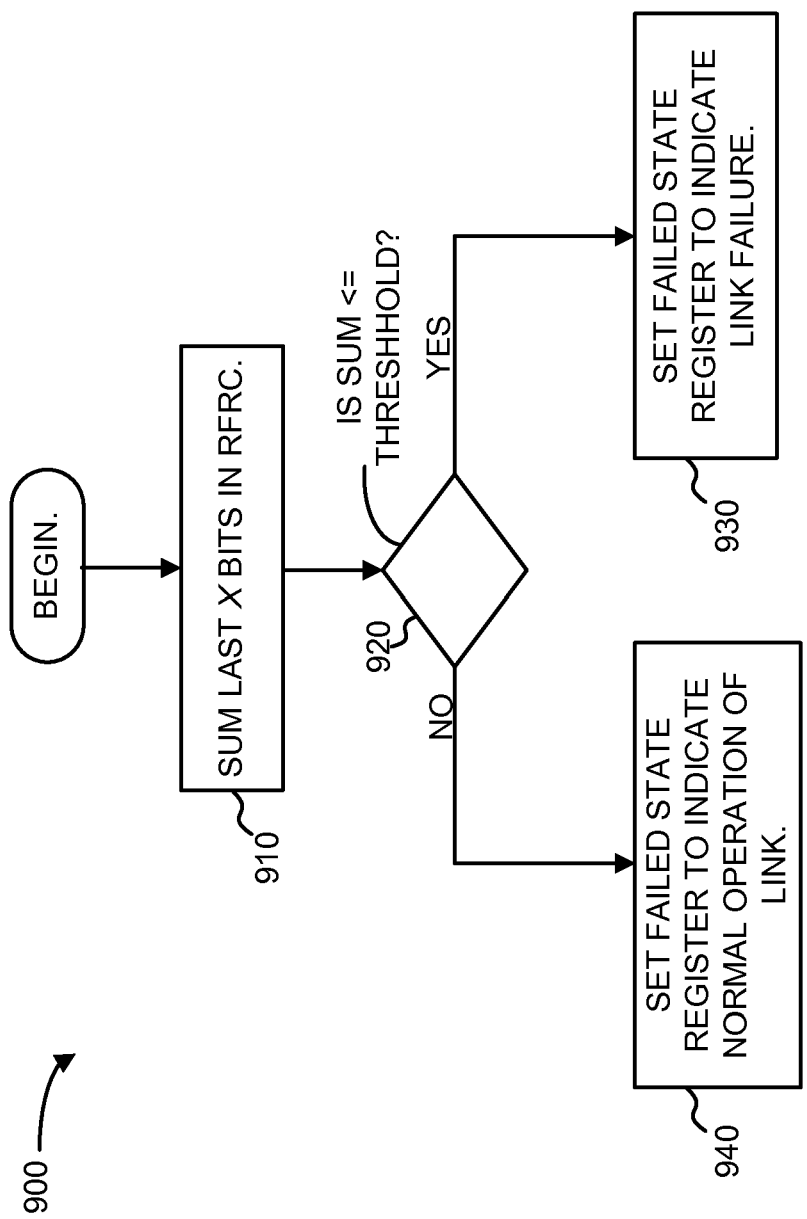
FIG. 9 is a flow chart illustrating a first example of a process for updating a failure state.

FIG. 9 is a flow chart illustrating a first example of a process 900 for updating the failure state. Process 900 may be performed, for example, by control logic 730 and may be based on the state of RFRC 740. In process 900, assume that the possible failure output states include "link failure" (SF) and "link working normally." In this situation, failure state register 750 may be implemented as a single bit, such as the SF bit shown in FIG. 7.

Process 900 may include summing the last x (where x is an integer) bits of RFRC 740 (block 910). In one implementation, x may be 5. In this case, the previous 5 values of RFRC 740 may be summed. The location of the previous x values may be determined based on the value of CFIC 735. If CFIC 735 has the value N, for instance, the sum may be of the positions in RFRC 740 corresponding to N, N-1, N-2, N-3, and N-4.

The sum obtained in block 910 may be compared to a preset threshold (block 920). In one implementation, the threshold may be set at zero. In this case, if the sum is equal to zero (i.e., when x is 5, no packets were received in the last 5 periods of timer 720) (block 920—YES), failure state register 750 may be set to indicate a link failure (block 930). In other words, the SF bit in failure state register 750 may be set. If the sum is greater than the threshold, however, (block 920—NO), failure state register 750 may be set to indicate normal working operation of the link (block 940). This may be implemented by clearing the SF bit in failure state register 750. In the example in which x is equal to 5 and the threshold is set to zero, this may indicate that at least one packet was received over the link in the last 5 periods of timer 720.

Figure 10:
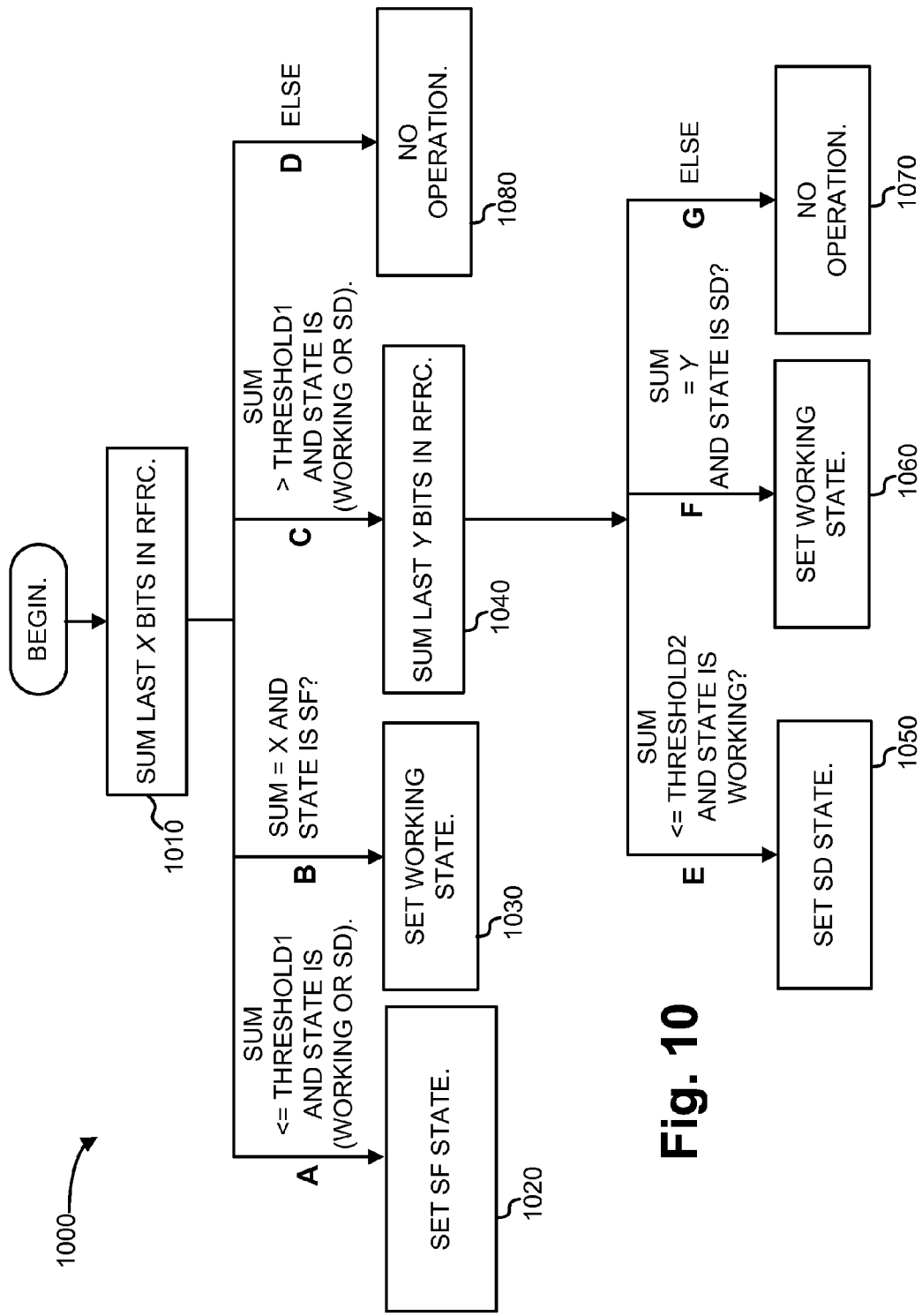
FIG. 10 is a flow chart illustrating a second example of a process for updating the failure state.

FIG. 10 is a flow chart illustrating a second example of a process 1000 for updating the failure state. Process 1000 may be performed, for example, by control logic 730 and may be based on the state of RFRC 740. In process 1000, assume that the possible failure output states include link failure (signal failure, SF), link degradation (signal degrade, SD), and "link working normally." In this situation, failure state register 750 may be implemented as a two bit register, such as failure state register 750.

Process 1000 may include summing the last x (where x is an integer) bits of RFRC 740 (block 1010). In one implementation, as with process 900, x may be 5. In this case, the previous 5 values of RFRC 740 may be summed. The location of the previous x values may be determined based on the value of CFIC 735.

Based on the result of the sum obtained in block 1010 and based on the existing link state (i.e., SF, SD, or working normally) four different decision paths may be taken, labeled in FIG. 10 as paths A, B, C, and D.

Path A may be taken when the sum calculated in block 1010 is less than a first threshold (THRESHOLD1) and the existing link state is working or SD. In path A, the link state may be set to link failure (SF) (block 1020). Link failure may be set in block 1020 by clearing the SD and setting the SF bit in failed state register 750. The first threshold may be a predetermined value. In one implementation, the first threshold may be set at zero. In this situation, block 1020 may be reached when the current state is working or SD and no packets are received in the previous x (e.g., 5) periods of timer 720.

Path B may be taken when the sum calculated in block 1010 is equal to x (i.e., a packet is received in every period of the previous x periods of timer 720) and the link state is SF. In path B, the link state may be set to working (block 1030). The working state may be set in block 1030 by clearing the SF bit in failed state register 750.

Path C may be taken when the sum calculated in block 1010 is greater than the first threshold and the existing link state is working or SD. Path C may generally correspond to signal degradation detection. Process 1000, in path C, may include summing the last y (where y is an integer that is greater than x) bits of RFRC 740 (block 1040). In one implementation, y may be set to ten (10).

Based on the result of the sum obtained in block 1040 and based on the existing link state, three different decision paths may be taken, labeled in FIG. 10 as paths E, F, and G. Path E may be taken when the sum calculated in block 1040 is less than or equal to a second threshold (THRESHOLD2) and the existing link state is working. In path E, the link state may be set to SD (block 1050). The SD state may be set in block 1030 by setting the SD bit in failed state register 750. In one implementation, the second threshold may set to a value equal to half of y (e.g., 5 in this example).

Path F may be taken when the sum calculated in block 1010 is equal to y (i.e., a packet is received in every period of the previous y periods of timer 720) and the link state is SD. In path F, the link state may be set to working (block 1060). The working state may be set in block 1060 by clearing the SD bit in failed state register 750.

If neither paths A, B, nor C are taken after block 1010, path D may be taken, which may result in a no operation state (block 1080). In other words, for path D, the link state remains the same as it was during the previous iteration. Similarly, if neither paths E nor F are taken after block 1040, path G may be taken, which may result in a no operation state (block 1070).

As described above, link failure over a point-to-point Ethernet link can be quickly determined. In the examples given, for instance, link failure can be detected in approximately 5 ms.

FAILURE NOTIFICATION

Detection of link failure was described between two devices, such as two switches, that form a point-to-point Ethernet link. In some situations, in response to the detection of a link failure, it is desirable that the link failure be communicated to other devices, such as other switches that rely on the failed link as part of a communication path.

One communication path that may be defined over Ethernet includes E-Line services. An E-Line connection may provide secure Ethernet connectivity between two network interfaces. E-Line services are frequently used in service provider networks, such as to enable service providers to seamlessly interconnect enterprise customers' LANs into a core IP transport network.

Ethernet Operations, Administration, and Maintenance (OAM) may generally refer to tools and utilities used to install, monitor, and troubleshoot a network. Ethernet OAM may be used with an E-Line connection to monitor the E-Line connection.

Figure 11:
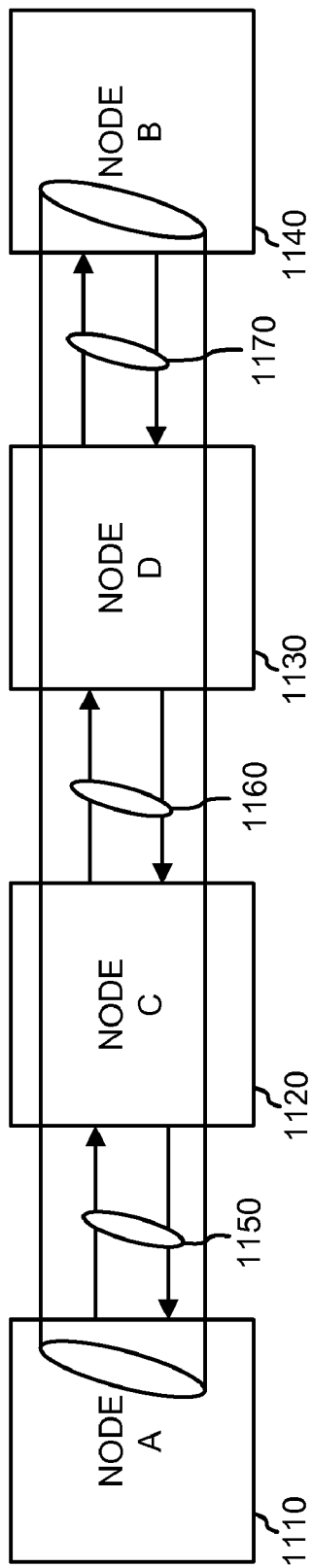
FIG. 11 is a diagram illustrating an example of an Ethernet communication path.

FIG. 11 is a diagram illustrating an example of an Ethernet communication path, which may also be called an Ethernet circuit herein, across four devices (also called "nodes" herein). In one implementation, the Ethernet circuit may be an E-Line path and each of the four nodes, labeled as nodes 1110, 1120, 1130, and 1140, may include switches or routers.

As is shown in FIG. 11, assume nodes 1110 and 1140 are the end-nodes in the communication path. The complete Ethernet circuit may be defined by three Ethernet point-to-point links. These links are labeled in FIG. 11 as: link 1150, between nodes 1110 and 1120, link 1160, between nodes 1120 and 1130; and link 1170, between nodes 1130 and 1140. For the direction from node 1110 to 1140, a packet using the service may start at node 1110, pass through link 1150, pass through node 1120, pass through link 1160, pass through node 1130, pass through link 1170, and arrive at node 1140.

Nodes 1110, 1120, 1130, and 1140 may be grouped as a virtual LAN (VLAN). In this case, the Ethernet circuit shown in FIG. 11 may be represented by the addresses, such as the MAC addresses, of the end nodes 1110 and 1140, and a VLAN ID. In some implementations, the Ethernet circuit may be defined by two VLANs. In this case, the Ethernet circuit may be represented by the addresses of the end nodes and by the two VLAN IDs.

Consistent with aspects described herein, in response to an indication of a failure of one of links 1150, 1160, or 1170, the node(s) that detect the failure may generate and transmit a failure notification message into the Ethernet circuit. The failure notification message may be a protocol data unit (PDU) that may be implemented as a packet, Ethernet frame, or other type of data unit. In one implementation, detection of a link failure may be performed by each of nodes 1110, 1120, 1130, and 1140 using the techniques described previously with reference to FIGS. 2-10.

Figure 12:
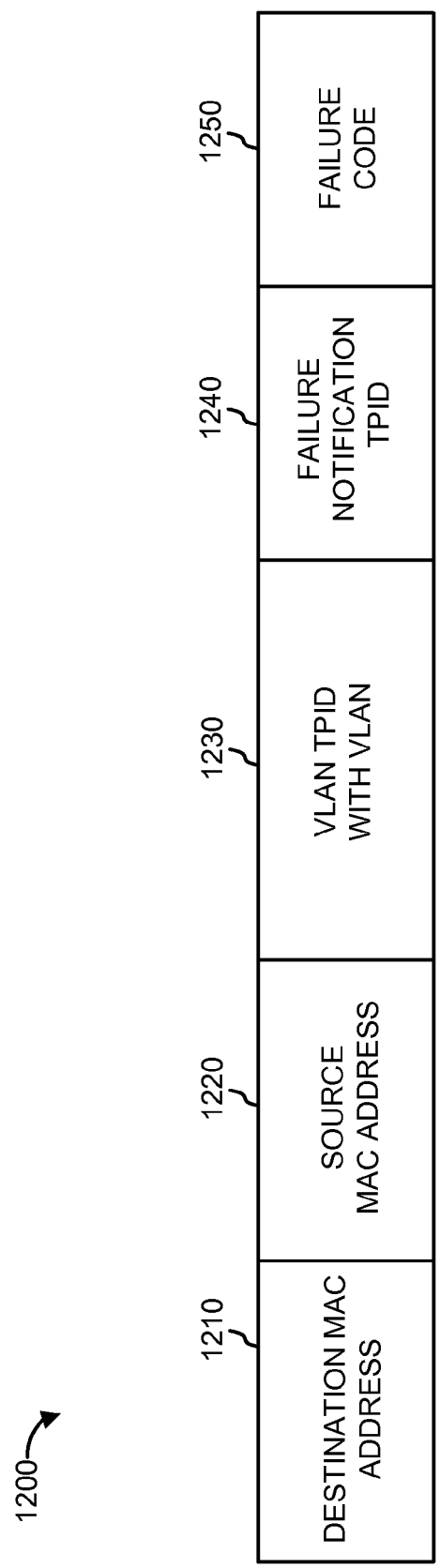
FIG. 12 is a diagram illustrating an example of a format of a protocol data unit that may be used to implement a failure notification message.

FIG. 12 is a diagram illustrating an example of a format of a PDU 1200 that may be used to implement a failure notification message. PDU 1200 may include a destination MAC address section 1210, a source MAC address section 1220, a VLAN TPID with VLAN section 1230, a failure notification TPID section 1240, and a failure code section 1250. In one implementation, destination MAC address section 1210 may be a six octet field that stores the MAC address of the destination node. Source MAC address section 1220 may be a six octet field that stores the MAC address of the source node. VLAN TPID with VLAN section 1230 may be a 4-8 octet field that stores a VLAN ID, such as a VLAN TPID value. Failure notification TPID section 1240 may be a two octet field that stores a TPID value that identifies PDU 1200 as a failure notification PDU. Failure code section 1250 may be a one octet field that stores a code that identifies a type of the failure detected. In one implementation, failure code section 1250 may be selected from one of four values, as shown in Table I.

TABLE I

| FIELD CODE | LABEL | DESCRIPTION |
| --- | --- | --- |
| 1 | AIS | Alarm indication signal that indicates a failure is detected in the direction of the received PDU. |
| 2 | RFI | Alarm indication signal that indicates a failure is detected in the reverse direction of the received PDU. |
| 3 | AIS_CLEARED | A previously detected AIS is cleared. |
| 4 | RFI_CLEARED | A previously detected RFI is cleared. |

As illustrated in Table 1, an AIS failure code may indicate that a failure was detected in the direction of the Ethernet circuit in which the PDU that contains the AIS failure code is traveling. A RFI failure code may indicate that a failure was detected in the reverse direction of the Ethernet circuit in which the PDU that contains the AIS failure code is traveling. In some situations, a failed link may be restored. For example, in the link failure detection techniques discussed previously, the failure state may change from SF to working The AIS_CLEARED and RFI_CLEARED failure codes may indicate that a previously detected failure is cleared.

Figure 13:
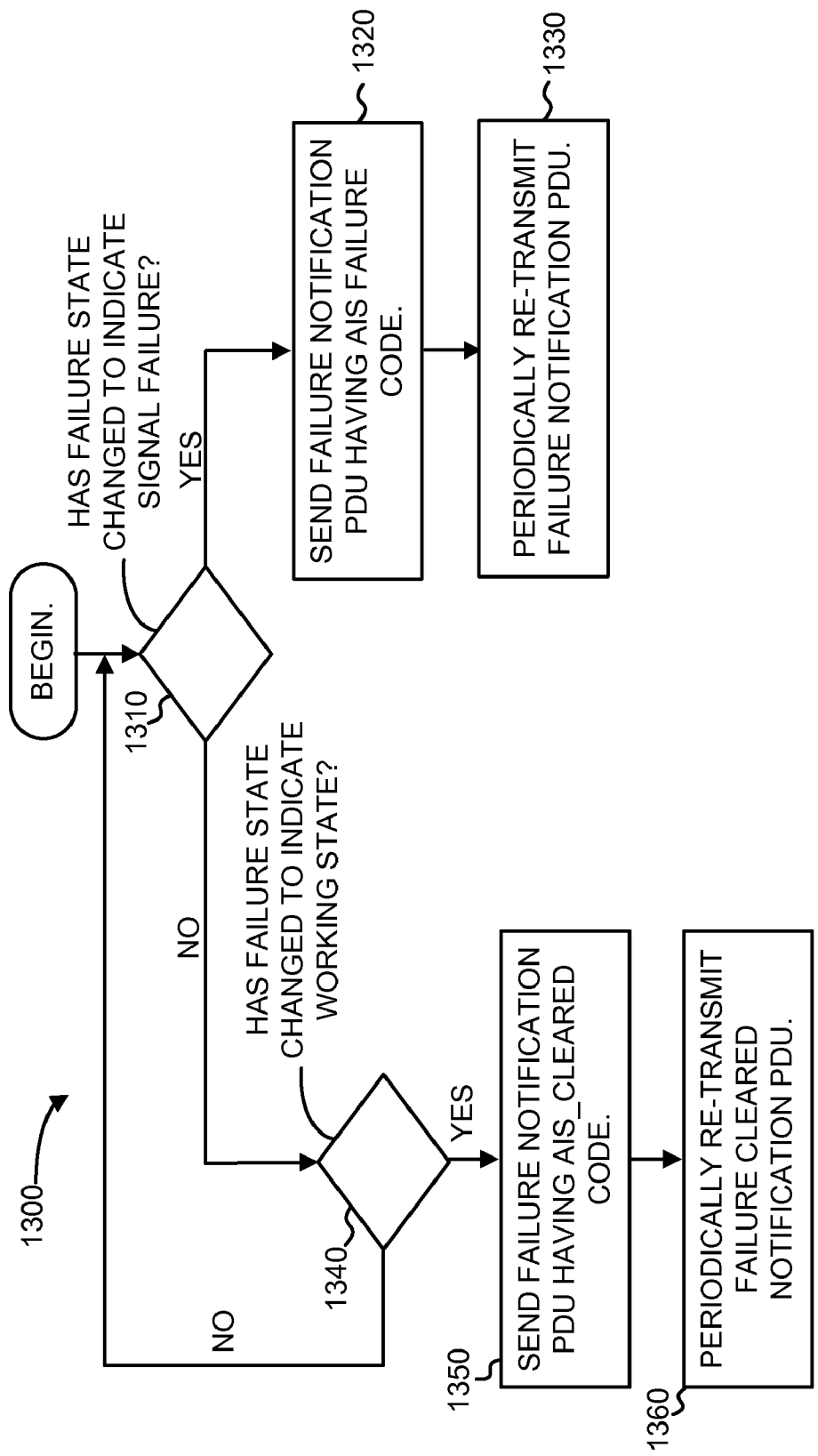
FIG. 13 is a flow chart illustrating a first example of a process for responding to a change in a detected failure state.

FIG. 13 is a flow chart illustrating an example of a process 1300 for responding to a change in a detected failure state. Process 1300 may be performed at, for example, each node in the Ethernet circuit shown in FIG. 11. The failure detection state may be either a SF or working state, as detected using the techniques described previously.

In the following description, the directional terms upstream and downstream are used. Upstream may refer to the direction opposite to the direction of data in the Ethernet circuit. Similarly, downstream may refer to the direction of data in the Ethernet circuit. In FIG. 11, for example, if node C receives a packet from node A, where the packet is to be sent to node B, node A is upstream and node B is downstream of node C.

Process 1300 may include determining whether the failure state has changed to indicate signal failure (e.g., failure state SF) (block 1310). When the failure state changes to indicate signal failure, (block 1310—YES), the node may send a failure notification PDU, such as PDU 1200, in which the AIS failure code is set (block 1320). The failure notification PDU may include the MAC address of the downstream end point in destination MAC address field 1210 and the MAC address of the current node (i.e., the node that detected the signal failure) in source MAC address field 1220.

Process 1300 may further include re-transmitting the AIS PDU sent in block 1310 (block 1330). The AIS PDU may be periodically retransmitted, such as every 1 ms.

Process 1300 may further include determining whether a previous failure state has changed to indicate a working state (block 1340). When the failure state changes to indicate working (block 1340—YES), the node may send a AIS_CLEARED PDU (block 1350). The AIS_CLEARED PDU may include the MAC address of the downstream end point in destination MAC address field 1210 and the MAC address of the current node (i.e., the node that detected the clearing of the signal failure) in source MAC address field 1220.

Process 1300 may further include re-transmitting the AIS_CLEARED PDU sent in block 1350 (block 1360). The PDU may be periodically retransmitted, such as every 1 ms.

Figure 14:
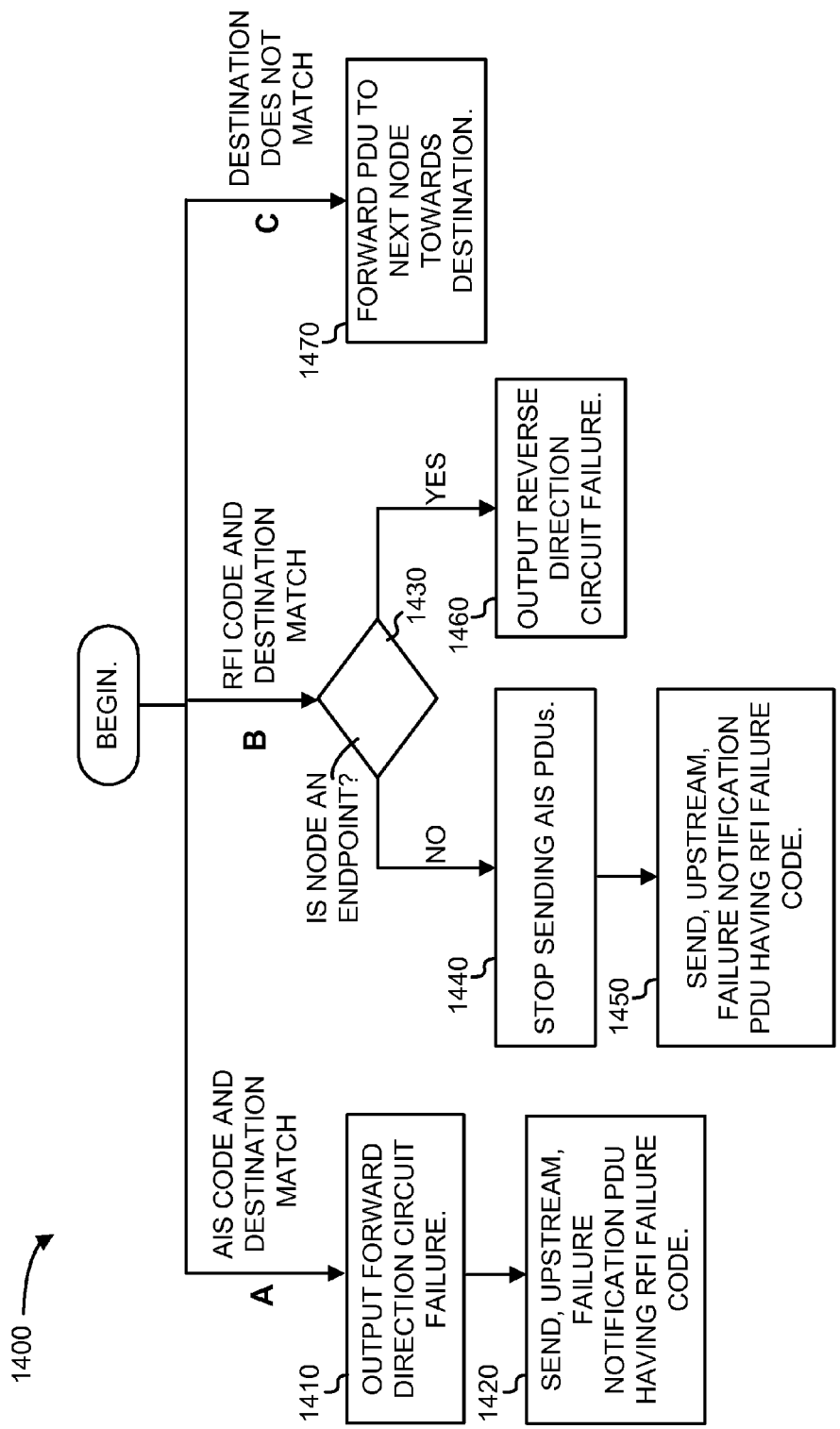
FIG. 14 is a flow chart illustrating an example of a process for handling received failure notifications.

FIG. 14 is a flow chart illustrating an example of a process 1400 for handling received failure notification PDUs at the nodes of an Ethernet circuit. Process 1400 may take a number of different decision paths based on the failure code and the destination MAC address of the failure notification PDU, labeled in FIG. 14 as paths A, B, and C. Process 1400 may be performed by each of the nodes in response to a received PDU failure notification.

Path A may be taken when the PDU has the AIS failure code set and when the node is the destination of the PDU (i.e., the node's MAC address matches the MAC address in destination MAC address field 1210). In path A, the node may output an indication of a forward direction circuit failure (block 1410). The node may, for instance, transmit an indication of the circuit failure to a remote or local OAM program. The node may send a second failure notification PDU, in which the RFI failure code is set (block 1420), upstream towards the node that sent the AIS PDU. The RFI PDU may include the MAC address of the failure node in destination MAC address field 1210 and the MAC address of the current node (i.e., the node that received the AIS failure code PDU) in source MAC address field 1220.

Path B may be taken when the PDU has the RFI failure code set and when the node is the destination of the PDU (i.e., the node's MAC address matches the MAC address in destination MAC address field 1210). In this situation, process 1400 may include determining whether the node is an endpoint in the Ethernet circuit to which the RFI PUD corresponds (block 1430). When the node is not an endpoint, (block 1430—NO), this may indicate that the node has previously started sending AIS failure code PDUs (FIG. 13, block 1320). The node may stop sending the AIS PDUs (block 1440). The node may additionally send upstream one or more additional failure notification PDUs, in which the RFI failure code is set (block 1450). The additional failure notification PDUs may include the MAC address of the upstream endpoint in destination MAC address field 1210 and the MAC address of the current node in source MAC address field 1220. In this manner, the RFI failure code will continue to propagate upstream to the other endpoint in the Ethernet circuit (assuming the upstream links are working).

When the node is an endpoint (block 1430—YES), the node may output an indication of a reverse direction circuit failure (block 1460). The node may, for instance, transmit an indication of the circuit failure to a remote or local OAM program. Path C may be taken when the destination address of the PDU does not match the node's MAC address. In this case, the node may forward the PDU, as normal, towards the destination of the PDU (block 1470).

Examples illustrating the transmission and reception of failure notifications pursuant to the processes illustrating in FIGS. 13 and 14 will next be described with reference to FIGS. 15-18.

Figure 15:
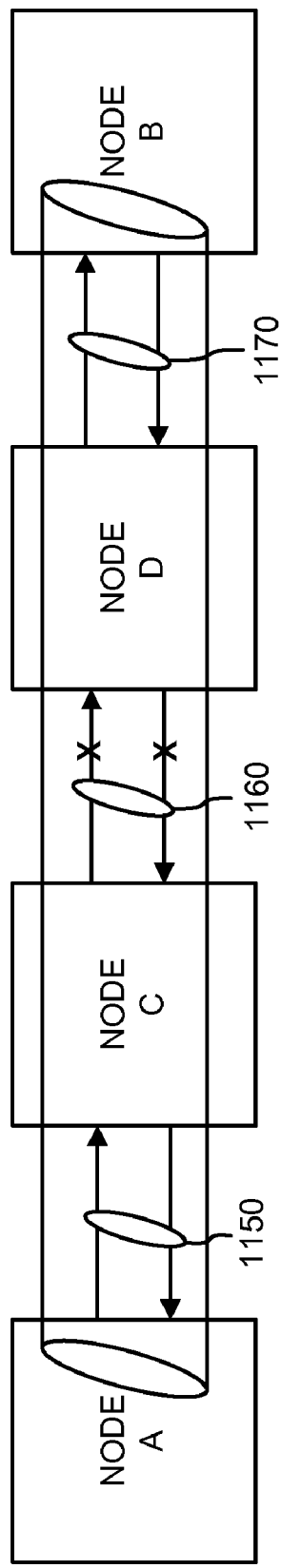
FIG. 15 is a diagram illustrating an example of an Ethernet circuit experiencing bidirectional link failure.

FIG. 15 is a diagram illustrating an example of an Ethernet circuit experiencing bidirectional link failure. In FIG. 15, assume that the link between nodes C and D, link 1160, fails in both directions (indicated by the "Xs" over the links in FIG. 15). Both nodes C and D may therefore detect the link failure.

From node D's point of view, it detects that the Ethernet circuit is broken at link 1160 in the direction from node A to node B. Therefore, for node D, the upstream direction is towards node A and the downstream direction is towards node B. Node D may send AIS failure code PDUs towards node B (blocks 1320 and 1330). Node B may receive the failure code PDUs, which will alert node B that there is a forward direction link failure in the Ethernet circuit (i.e., a failure in the link from node C to node D). Node B may transmit a RFI failure code PDU to node D (block 1420). Node D may receive the RFI failure code from node B, and in response, stop sending the AIS failure code PDUs (block 1440) and send additional RFI failure code PDUs upstream to node A (block 1450). Because the link failure in link 1160 is bidirectional, however, these RFI failure code PDUs will not reach node A.

Nodes C and A may operate similarly to nodes D and B, respectively. For node C, the upstream endpoint may be node B and the downstream endpoint may be node A. At the end of the failure code exchange, a network management application, such as an OAM application, by checking the failure conditions of the two endpoints, nodes A and B, may be able to determine a bidirectional failure between nodes C and D.

Figure 16:
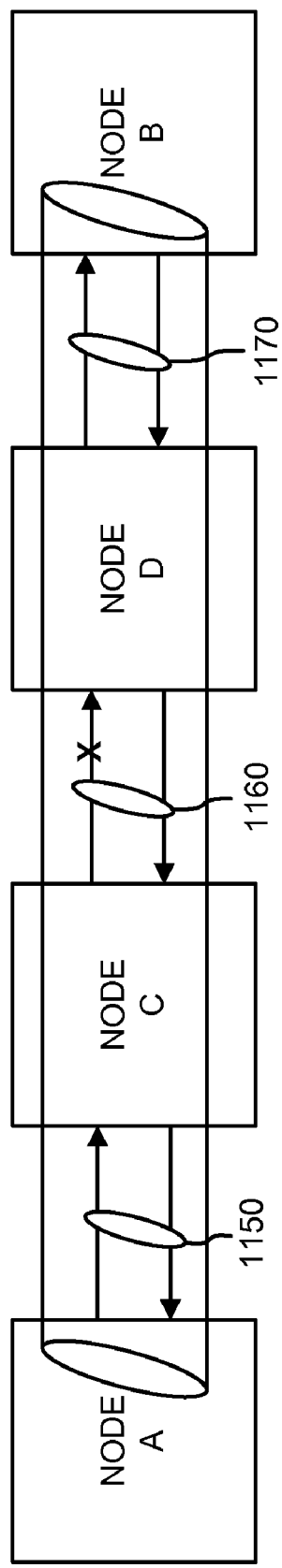
FIG. 16 is a diagram illustrating an example of an Ethernet circuit experiencing unidirectional link failure.

FIG. 16 is a diagram illustrating an example of an Ethernet circuit experiencing unidirectional link failure. In FIG. 16, assume that the link between nodes C and D, link 1160, has failed in the direction from C to D. Only node D may therefore detect the link failure.

From node D's point of view, it detects that the Ethernet circuit is broken at link 1160 in the direction from node A to node B. Therefore, for node D, the upstream direction is towards node A and the downstream direction is towards node B. Node D may send AIS failure code PDUs towards node B (blocks 1320 and 1330). Node B may receive the AIS PDUs, which will alert node B that there is a forward direction link failure in the Ethernet circuit (i.e., a failure in the link from node C to node D). Node B may transmit a RFI failure code PDU to node D (block 1420). Node D may receive the RFI failure code from node D, and in response, stop sending the AIS failure code PDUs (block 1440) and send additional RFI failure code PDUs upstream to node A (block 1450). Node A may receive the additional RFI failure code PDUs from node D and output an indication that it has detected a reverse direction circuit failure (block 1460).

At the end of the failure code exchange, a network management application, such as an OAM application, by checking the failure conditions of the two endpoints, nodes A and B, will see a forward direction failure condition at node B and a reverse direction failure condition at node A. The network management application may thus determine there is a unidirectional failure between nodes C and D.

Figure 17:
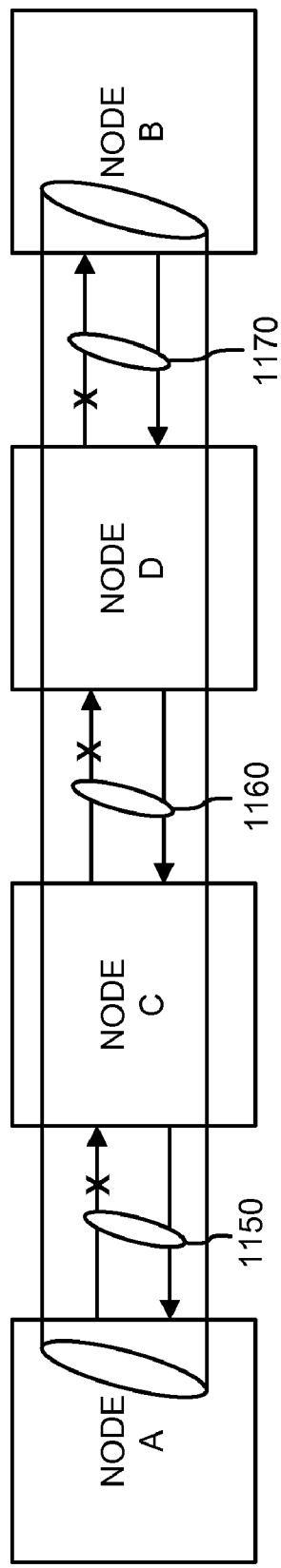
FIG. 17 is a diagram illustrating an example of an Ethernet circuit experiencing a "double" unidirectional link failure.

FIG. 17 is a diagram illustrating an example of an Ethernet circuit experiencing a "double" unidirectional link failure. In FIG. 17, assume that after the situation shown in FIG. 16, link 1150, from node A to node C, and link 1170, from node D to node B, additionally fail.

Node C may detect the failure of link 1150. For node C, the upstream direction is towards node A and the downstream direction is towards node B. Node C may send AIS failure code PDUs towards node B (blocks 1320 and 1330). Because of the downstream link failures, the AIS PDUs from node C will be lost.

Node B may detect the failure of link 1170. For node B, the upstream direction is towards node A and the downstream direction is towards itself (i.e., there is no downstream node). Because there is no downstream node for node B, node B may not actually send AIS failure code PDUs. Alternatively, node B may send the AIS failure codes to itself. After "receiving" the AIS failure code PDUs, node B may indicate that there is a forward direction link failure in the Ethernet circuit. In some situations, because node B previously indicated (in the flow of FIG. 16) that an AIS failure code was received, node B may refrain from indicating that there is an additional forward direction link failure. Node B may transmit a RFI failure code PDU towards node A (block 1420).

At some point, a failed link may be restored. In response to restoration of a link, a node may generate an AIS_CLEARED PDU (block 1350) to indicate cessation of the link failure state.

Figure 18:
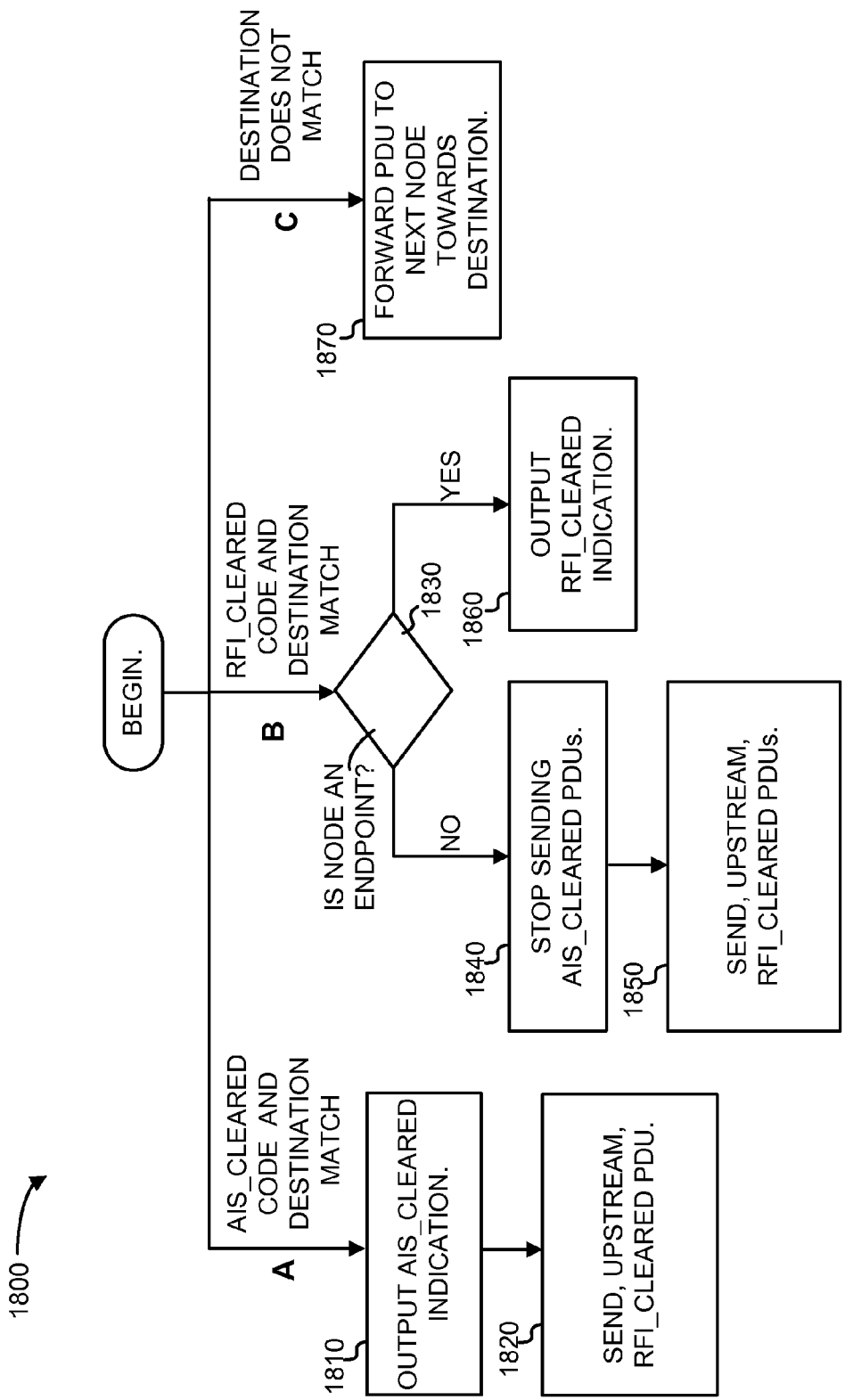
FIG. 18 is a flow chart illustrating an example of a process for handling received failure cleared notification protocol data units.

FIG. 18 is a flow chart illustrating an example of a process 1800 for handling received failure cleared notification PDUs (i.e., AIS_CLEARED PDU and RFI_CLEARED PDU) at the nodes of an Ethernet circuit. Process 1900 may take a number of different decision paths based on the failure code and the destination MAC address of the failure notification PDU, labeled in FIG. 18 as paths A, B, and C. Process 1800 may be performed by each of the nodes in response to a received AIS_CLEARED PDU or RFI_CLEARED PDU failure notification. Path A may be taken when the PDU has the AIS_CLEARED code set and when the node is the destination of the PDU (i.e., the node's MAC address matches the MAC address in destination MAC address field 1210). In path A, the node may output an indication that the AIS_CLEARED was received, i.e., an indication that the previous forward direction circuit failure is cleared (block 1810). In some implementations, to ensure that other failures are not still in the system, the node may delay a period, such as 2 ms, before outputting the indication that the AIS_CLEARED PDU was received. The node may, for instance, transmit an indication of the clearing of the circuit failure to a remote or local OAM program. The node may send an RFI_CLEARED PDU (block 1820), upstream towards the node the sent the AIS_CLEARED PDU. The RFI_CLEARED PDU may include the MAC address of the node that cleared the failure in destination MAC address field 1210 and the MAC address of the current node in source MAC address field 1220.

Path B may be taken when the PDU has the RFI_CLEARED code set and when the node is the destination of the PDU. In this situation, process 1800 may include determining whether the node is an endpoint in the Ethernet circuit (block 1830). When the node is not an endpoint, (block 1830—NO), this indicates that the node has previously started sending AIS_CLEARED PDUs (FIG. 13, block 1350). The node may stop sending the AIS_CLEARED PDUs (block 1840). The node may additionally send upstream one or more additional RFI_CLEARED PDUs (block 1850). The additional RFI_CLEARED PDUs may include the MAC address of the upstream endpoint in destination MAC address field 1210 and the MAC address of the current node in source MAC address field 1220. In this manner, the RFI_CLEARED code will continue to propagate upstream to the other endpoint in the Ethernet circuit.

When the node is an endpoint (block 1830—YES), the node may output an indication of a reverse direction failure clearance (block 1860). In some implementations, to ensure that other failures are not still in the system, the node may delay a period, such as 2 ms, before outputting the indication of the reverse direction failure clearance. The node may, for instance, transmit an indication of the cessation of the circuit failure to a remote or local OAM program.

Path C may be taken when the destination address of the PDU does not match the node's MAC address. In this case, the node may forward the PDU, as normal, towards the destination of the PDU (block 1870).

Examples illustrating the transmission and reception of failure cleared notifications pursuant to the processes illustrating in FIGS. 13 and 18 will next be described.

Assume that the bidirectional link failure illustrated in FIG. 15 clears. From node D's point of view, it previously detected that the Ethernet circuit is broken at link 1160 in the direction from node A to node B. Therefore, for clearing the detected failure, the upstream direction is towards node A and the downstream direction is towards node B.

Node D may send AIS_CLEARED PDUs towards node B (blocks 1350 and 1360). Node B may receive the AIS_CLEARED PDUs, which will alert node B that the previous forward direction link failure is cleared. Node B may transmit a RFI_CLEARED PDU to node D (block 1820). Node D may receive the RFI_CLEARED code from node B, and in response, stop sending the AIS_CLEARED failure code PDUs (block 1840) and send additional RFI_CLEARED PDUs upstream to node A (block 1850).

Nodes C and A may operate similarly to nodes D and B, respectively. For node C, the upstream endpoint may be node B and the downstream endpoint may be node A. At the end of the PDU exchange, a network management application, such as an OAM application, by checking the failure conditions of the two endpoints, nodes A and B, may be able to determine cessation of the bidirectional failure.

Assume that the unidirectional link failure illustrated in FIG. 16 clears. From node D's point of view, it detects that the previous link failure at link 1160 has cleared. Therefore, for node D, the upstream direction is towards node A and the downstream direction is towards node B. Node D may send AIS_CLEARED PDUs towards node B (blocks 1350 and 1360). Node B may receive an AIS_CLEARED PDUs, which will alert node B that the forward direction link failure has cleared PFE. Node B may transmit a RFI_CLEARED PDU to node D (block 1820). Node D may receive the RFI_CLEARED PDU from node B, and in response, stop sending the AIS_CLEARED PDUs (block 1840) and send additional RFI_CLEARED PDUs upstream to node A (block 1850). Node A may receive the additional RFI_CLEARED PDUs from node D and output an indication that it has detected the cessation of the reverse direction circuit failure (block 1860).

Assume that in the double unidirectional link failure illustrated in FIG. 17, the failure on link 1170 clears. Node B may detect that link 1170 is working and send back a RFI_CLEARED PDU towards node A. When node A receives the RFI_CLEARED PDU, node A may begin to output an indication that it has detected the cessation of the reverse direction circuit failure. As mentioned previously, however, before outputting an indication of RFI_CLEARED or AIS_CLEARED, the node may delay a period, such as 2 ms. Because link 1150 may still be down however, node A may receive another RFI PDU from node C, causing node A to cancel the sending of the indication that is has detected the cessation of the reverse direction circuit failure.

CONCLUSION

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 6, 8-10, 13, 14, and 18, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A hardware device comprising:
   a timer to generate a periodic signal;
   a register to indicate whether a packet has been received over an incoming Ethernet link to the hardware device for each of a plurality of periods of the periodic signal;
   a buffer that includes a plurality of storage locations, each of the plurality of storage locations corresponding to one of the plurality of periods of the periodic signal; and
   control logic to, for each of the plurality of periods:
      set a value, corresponding to one of the plurality of storage locations, in the buffer when the register indicates that a packet has been received over the incoming Ethernet link;
      clear the value in the buffer when the register indicates that no packets have been received over the incoming Ethernet link; and
      reset the register to indicate that no packets have been received.

2. The hardware device of claim 1, where the control logic is additionally to:
   analyze the buffer to determine whether there is a signal failure state on the incoming Ethernet link.

3. The hardware device of claim 2, further comprising:
   a failure state register, where the control logic, based on the analysis, is to store a value in the failure state register that indicates a signal state of the incoming Ethernet link based on analyzing the buffer.

4. The hardware device of claim 2, where, the control logic additionally is to analyze the buffer to determine whether there is a signal degraded state on the incoming Ethernet link.

5. The hardware device of claim 1, where the register includes a counter that is incremented for each packet received over the incoming Ethernet link.

6. The hardware device of claim 1, where the register includes a one-bit register that is set when a packet is received over the incoming Ethernet link.

7. The hardware device of claim 1, where the buffer includes a circular buffer, and where the control logic includes:
   an index register to keep track of a current location within the circular buffer.

8. The hardware device of claim 1, where the device includes an Ethernet switch and the incoming Ethernet link includes a point-to-point Ethernet link.

9. The hardware device of claim 1, further comprising:
   a second timer to generate a second periodic signal; and
   where the control logic is to determine, based on the second periodic signal, whether a packet was transmitted on an outgoing Ethernet link from the device during a previous period of the second periodic signal and to transmit a null packet on the outgoing Ethernet link when it is determined that a packet was not transmitted on the outgoing Ethernet link during the previous period of the second periodic signal.

10. A device implemented method comprising:
    determining, by the device and based on a first periodic timing signal, whether a packet was transmitted on an outgoing Ethernet link from the device during a previous period of the first periodic timing signal;
    transmitting, by the device, a null packet on the outgoing Ethernet link when a packet was not transmitted on the outgoing Ethernet link during the previous period of the first periodic timing signal;
    determining, by the device and based on a second periodic timing signal, whether at least one packet was received on an incoming Ethernet link during a previous period of the second periodic timing signal;
    updating, by the device, an entry in a circular buffer to indicate whether the at least one packet was received during the previous period of the second periodic timing signal;
    analyzing, by the device, the circular buffer to determine whether there is a signal failure on the incoming Ethernet link; and
    generating, by the device and based on the analyzing, an indication of whether there is a signal failure on the incoming Ethernet link.

11. The method of claim 10, where determining whether a packet was transmitted on the outgoing Ethernet link from the device includes:
    incrementing a counter in response to transmission of a packet on the outgoing Ethernet link; and
    determining whether the counter has been incremented during the previous period of the first periodic timing signal.

12. The method of claim 11, where determining whether a packet was transmitted on the outgoing Ethernet link from the device further includes:
    clearing the counter after each period of the first periodic timing signal.

13. The method of claim 10, further comprising:
    dropping null packets received at the incoming Ethernet link.

14. The method of claim 10, where the entry updated in the circular buffer includes a current bit in the circular buffer that is set when the at least one packet was received and cleared.

15. The method of claim 10, where analyzing the circular buffer includes:
    summing a predetermined number of previous entries in the circular buffer to obtain a sum; and
    comparing the sum to a predetermined threshold value to determine whether there is a signal failure on the incoming Ethernet link.

16. The method of claim 10, where the indication of whether there is the signal failure on the incoming Ethernet link includes an indication that the incoming Ethernet link is in a working state, a signal failure state, or a degraded signal state.

17. The method of claim 10, where the Ethernet link includes a point-to-point link.

18. A device implemented method comprising:
    receiving, by a node in a plurality of nodes that implement an Ethernet circuit, an indication of a failure of an incoming Ethernet link at a port of the node;
    transmitting, by the node, a first failure notification data unit in response to the received indication of failure, the first failure notification data unit being transmitted at a to the failed incoming Ethernet link;
    periodically retransmitting, by the node, the first failure notification data unit;

stopping the periodic retransmission of the first failure notification data unit in response to receiving a second failure notification that is transmitted in an upstream direction within the Ethernet circuit relative to the failed incoming Ethernet link;

determining, by the node and in response to reception of a third failure notification data unit, whether a destination address of the third failure notification data unit matches an address of the node; and outputting an indication of failure of the Ethernet circuit when the destination address of the third failure notification data unit matches the address of the node.

19. The method of claim 18, further comprising:

receiving an indication of cessation of the failure of the incoming Ethernet link at the port of the node; and transmitting a failure cleared notification data unit in response to the received indication of cessation of the failure, the failure cleared notification data unit being transmitted at the second port of the node and in the downstream direction within the Ethernet circuit relative to the incoming Ethernet link.

20. The method of claim 18, further comprising:

transmitting a fourth failure notification data unit when the destination address of the third failure notification data unit matches the address of the node, where the fourth failure notification data unit is transmitted in an upstream direction within the Ethernet circuit relative to the failed incoming Ethernet link.

21. The method of claim 18, where outputting an indication of failure of the Ethernet circuit includes notifying an Ethernet Operations, Administration, and Maintenance (OAM) software application.

22. The method of claim 18, where the destination address of the third failure notification data unit and the address of the node include media access control (MAC) addresses.

23. The method of claim 18, further comprising:

delaying the outputting of the indication of failure of the Ethernet circuit.

24. A hardware device comprising:

a plurality of ports;

logic to detect a signal failure of an incoming Ethernet link, which is part of an Ethernet circuit, at a first one of the plurality of ports, and to output a corresponding signal failure signal;

logic to transmit a first failure notification data unit in response to the signal failure signal, the first failure notification data unit being transmitted at a second one of the plurality of ports and in a downstream direction within the Ethernet circuit relative to the failed incoming Ethernet link;

logic to periodically retransmit the first failure notification data unit;

logic to stop the periodic retransmission of the first failure notification in response to receiving a second failure notification that is transmitted in an upstream direction within the Ethernet circuit relative to the failed incoming Ethernet link;

logic to receive an indication of cessation of a failure of the incoming Ethernet link at the first one of the plurality of ports; and logic to transmit a failure cleared notification data unit in response to the received indication of cessation of the failure, the failure cleared notification data unit being transmitted at the second port of the node and in the downstream direction within the Ethernet circuit relative to the incoming Ethernet link.

25. The hardware device of claim 24, further comprising:

logic to determine, in response to reception of a second failure notification data unit by the hardware device, whether a destination address of the second failure notification data unit matches an address of the device; and logic to output an indication of failure of the Ethernet circuit when the destination address of the second failure notification data unit matches the address of the node.

26. The hardware device of claim 25, where the logic to output the indication of failure of the Ethernet circuit includes notifying an Ethernet Operations, Administration, and Maintenance (OAM) software application.

27. The hardware device of claim 26, where the logic to output the indication of failure of the Ethernet circuit delays the output of the indication of failure of the Ethernet circuit.

28. A device implemented method comprising:

determining, by a node in a plurality of nodes that implement an Ethernet circuit, and based on a first periodic timing signal, whether at least one packet was received on an incoming Ethernet link, at a first port of the node, during a previous period of the first periodic timing signal;

updating, by the node, an entry in a circular buffer to indicate whether the at least one packet was received during the previous period of the first periodic timing signal;

analyzing, by the node, the circular buffer to determine whether there is a signal failure on the incoming Ethernet link;

generating, by the node and based on the analysis, an indication of whether there is a signal failure on the incoming Ethernet link;

transmitting, by the node, a first failure notification data unit in response to the generated indication of failure, the failure notification data unit being transmitted at a second port of the node and in a downstream direction within the Ethernet circuit relative to the failed incoming Ethernet link; and transmitting, by the node, a failure cleared notification data unit in response to cessation of the indication that there is a signal failure on the incoming Ethernet link, the failure cleared notification data unit being transmitted at a second port of the node and in the downstream direction within the Ethernet circuit relative to the incoming Ethernet link.

29. The method of claim 28, further comprising:

determining, by the node and in response to reception of a second failure notification data unit, whether a destination address of the second failure notification data unit matches an address of the node; and outputting an indication of failure of the Ethernet circuit when the destination address of the second failure notification data unit matches the address of the node.

30. The method of claim 28, further comprising:

determining based on a second periodic timing signal, whether a packet was transmitted on an outgoing Ethernet link from the node during a previous period of the second periodic timing signal; and transmitting a null packet on the outgoing Ethernet link when a packet was not transmitted on the outgoing Ethernet link during the previous period of the first periodic timing signal.

* * * * *

UNITED STATES PATENT AND TRADEMARK OFFICE
CERTIFICATE OF CORRECTION

PATENT NO.       : 8,195,989 B1
APPLICATION NO.  : 12/860431
DATED            : June 5, 2012
INVENTOR(S)      : CunZhi Lu et al.

It is certified that error appears in the above-identified patent and that said Letters Patent is hereby corrected as shown below:

Claim 18, column 18, lines 64-67 should read: "first failure notification data unit being transmitted at a second port of the node and in a downstream direction within the Ethernet circuit relative to the failed incoming Ethernet link;"

Signed and Sealed this
Twenty-fifth Day of September, 2012

David J. Kappos
*Director of the United States Patent and Trademark Office*